US011449744B2

(12) United States Patent
Chen et al.

(10) Patent No.: US 11,449,744 B2
(45) Date of Patent: Sep. 20, 2022

(54) END-TO-END MEMORY NETWORKS FOR CONTEXTUAL LANGUAGE UNDERSTANDING

(71) Applicant: Microsoft Technology Licensing, LLC, Redmond, WA (US)

(72) Inventors: Yun-Nung Chen, New Taipei (TW); Dilek Z. Hakkani-Tur, Kirkland, WA (US); Gokhan Tur, Kirkland, WA (US); Li Deng, Redmond, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 690 days.

(21) Appl. No.: 15/229,039

(22) Filed: Aug. 4, 2016

(65) Prior Publication Data

US 2017/0372200 A1   Dec. 28, 2017

Related U.S. Application Data

(60) Provisional application No. 62/354,076, filed on Jun. 23, 2016.

(51) Int. Cl.
| | | |
|---|---|---|
| *G06N 3/08* | (2006.01) | |
| *G06N 3/04* | (2006.01) | |
| *G10L 15/16* | (2006.01) | |
| *G10L 15/18* | (2013.01) | |
| *G10L 15/22* | (2006.01) | |

(52) U.S. Cl.
CPC ............. *G06N 3/08* (2013.01); *G06N 3/0445* (2013.01); *G10L 15/16* (2013.01); *G10L 15/1822* (2013.01); *G10L 15/22* (2013.01)

(58) Field of Classification Search
CPC ............ G06N 20/00; G06N 3/08; G06N 3/04; G06N 3/0454; G06N 3/084; G06N 5/04;
(Continued)

(56) References Cited

U.S. PATENT DOCUMENTS 5,748,973 A   5/1998 Palmer et al.
5,832,429 A   11/1998 Gammel et al.
(Continued)

FOREIGN PATENT DOCUMENTS

CN   104538028   4/2015
JP   2007127896   5/2007

OTHER PUBLICATIONS

Antoine Bordes et al. "Learning End-to-End Goal-Oriented Dialog", May 24, 2016 pp. 1-11.*
(Continued)

*Primary Examiner* — Ann J Lo
*Assistant Examiner* — Charles C Kuo
(74) *Attorney, Agent, or Firm* — Schwegman Lundberg & Woessner, P.A.

(57) ABSTRACT

A processing unit can extract salient semantics to model knowledge carryover, from one turn to the next, in multi-turn conversations. Architecture described herein can use the end-to-end memory networks to encode inputs, e.g., utterances, with intents and slots, which can be stored as embeddings in memory, and in decoding the architecture can exploit latent contextual information from memory, e.g., demographic context, visual context, semantic context, etc. e.g., via an attention model, to leverage previously stored semantics for semantic parsing, e.g., for joint intent prediction and slot tagging. In examples, architecture is configured to build an end-to-end memory network model for contextual, e.g., multi-turn, language understanding, to apply the end-to-end memory network model to multiple turns of conversational input; and to fill slots for output of contextual, e.g., multi-turn, language understanding of the conversational input. The neural network can be learned using backpropagation from output to input using gradient descent optimization.

11 Claims, 10 Drawing Sheets

(58) Field of Classification Search
CPC ........ G06N 20/20; G06N 3/02; G06N 3/0445; G06N 3/0481; G06N 20/10; G06N 3/0472; G06N 3/063; G06N 5/003; G06N 5/02; G06N 5/046
See application file for complete search history.

(56) References Cited

U.S. PATENT DOCUMENTS

| | | | |
|---|---|---|---|
| 5,873,056 | A | 2/1999 | Liddy et al. |
| 6,615,178 | B1 | 9/2003 | Tajima |
| 6,999,914 | B1 | 2/2006 | Boerner et al. |
| 7,313,523 | B1 | 12/2007 | Bellegarda et al. |
| 8,204,751 | B1 | 6/2012 | Di Fabbrizio et al. |
| 8,548,951 | B2 | 10/2013 | Solmer et al. |
| 9,239,828 | B2 | 1/2016 | Yao et al. |
| 9,836,671 | B2 | 12/2017 | Gao et al. |
| 10,318,870 | B2 * | 6/2019 | Adderly ................ G06N 5/022 |
| 10,366,163 | B2 | 7/2019 | Chen et al. |
| 2004/0083092 | A1 | 4/2004 | Valles |
| 2004/0167778 | A1 | 8/2004 | Valsan et al. |
| 2004/0186730 | A1 | 9/2004 | Sun et al. |
| 2005/0055209 | A1 | 3/2005 | Epstein et al. |
| 2005/0105712 | A1 | 5/2005 | Williams et al. |
| 2005/0251383 | A1 | 11/2005 | Murray |
| 2006/0074634 | A1 | 4/2006 | Gao et al. |
| 2006/0129396 | A1 | 6/2006 | Ju et al. |
| 2006/0253273 | A1 | 11/2006 | Feldman et al. |
| 2007/0010900 | A1 | 1/2007 | Kavaklioglu et al. |
| 2007/0010990 | A1 | 1/2007 | Woo |
| 2007/0094006 | A1 | 4/2007 | Todhunter et al. |
| 2007/0156393 | A1 | 7/2007 | Todhunter et al. |
| 2007/0225977 | A1 | 9/2007 | Emam et al. |
| 2007/0260450 | A1 | 11/2007 | Sun |
| 2009/0030686 | A1 | 1/2009 | Weng et al. |
| 2009/0063473 | A1 | 3/2009 | Van den Berg et al. |
| 2010/0030552 | A1 | 2/2010 | Chen et al. |
| 2011/0054883 | A1 | 3/2011 | Yun et al. |
| 2011/0087483 | A1 | 4/2011 | Hsieh et al. |
| 2012/0197631 | A1 | 8/2012 | Ramani et al. |
| 2012/0239378 | A1 | 9/2012 | Parfentieva et al. |
| 2013/0268260 | A1 * | 10/2013 | Lundberg ................ G06F 17/28 704/8 |
| 2013/0325436 | A1 | 12/2013 | Wang et al. |
| 2014/0113263 | A1 | 4/2014 | Jarrell et al. |
| 2014/0236577 | A1 | 8/2014 | Malon et al. |
| 2014/0236578 | A1 | 8/2014 | Malon et al. |
| 2014/0278355 | A1 | 9/2014 | Sarikaya et al. |
| 2014/0278379 | A1 * | 9/2014 | Coccaro .............. G10L 15/1822 704/202 |
| 2015/0066496 | A1 * | 3/2015 | Deoras ................ G06N 3/0454 704/232 |
| 2015/0161101 | A1 | 6/2015 | Yao et al. |
| 2015/0178265 | A1 | 6/2015 | Anderson et al. |
| 2015/0199333 | A1 | 7/2015 | Nekhay |
| 2015/0269949 | A1 | 9/2015 | Chang et al. |
| 2015/0332049 | A1 | 11/2015 | Chen et al. |
| 2015/0347521 | A1 | 12/2015 | Zhu et al. |
| 2016/0124943 | A1 | 5/2016 | Zu et al. |
| 2016/0196258 | A1 | 7/2016 | Ma et al. |
| 2016/0350655 | A1 | 12/2016 | Weiss et al. |
| 2017/0270919 | A1 | 9/2017 | Parthasarathi et al. |
| 2017/0286401 | A1 | 10/2017 | He et al. |
| 2018/0067923 | A1 | 3/2018 | Chen et al. |
| 2019/0303440 | A1 | 10/2019 | Chen et al. |

OTHER PUBLICATIONS

Labutov et al., Re-embedding Words, 2013, Proceedings of the 51st Annual Meeting of the Association for Computational Linguistics, pp. 489-493 (Year: 2013).*

Li, Yitan et al., Word Embedding Revisited: A New Representation Learning and Explicit Matrix Factorization Perspective, 2015, Proceedings of the Twenty-Fourth International Joint Conference on Artificial Intelligence (IJCAI 2015), pp. 3650-3656 (Year: 2015).*

"Attention and Memory in Deep Learning And NLP", Retrieved From: https://web.archive.org/web/20160802082956/http://www.wildml.com/2016/01/attention-and-memory-in-deep-learning-and-nlp/, Jan. 3, 2016, 11 Pages.

"Final Office Action Issued in U.S. Appl. No. 15/258,639", dated Oct. 4, 2018, 20 Pages.

"Non Final Office Action Issued in U.S. Appl. No. 15/258,639", dated Mar. 13, 2018, 26 Pages.

Berant, et al., "Semantic Parsing on Freebase From Question-Answer Pairs", In Proceedings of Conference on Empirical Methods in Natural Language Processing, Oct. 18, 2013, pp. 1533-1544.

Celikyilmaz, et al., "Convolutional Neural Network Based Semantic Tagging with Entity Embeddings", In Proceeding of NIPS Workshop on Machine Learning for SLU and Interaction, Dec. 11, 2015, pp. 1-7.

Celikyilmaz, et al., "Enriching Word Embeddings Using Knowledge Graph for Semantic Tagging in Conversational Dialog Systems", In Proceedings of Association for the Advancement of Artificial Intelligence, Jan. 19, 2015, pp. 39-42.

Chen, "A Fast and Accurate Dependency Parser Using Neural Networks", In the Proceedings of the Conference on Empirical methods in Natural Language Processing, Oct. 2014, 11 Pages.

Chopra, et al., "Abstractive Sentence Summarization with Attentive Recurrent Neural Networks", In Proceedings of 15th Annual Conference of the North American Chapter of the Association for Computational Linguistics: Human Language Technologies, Jun. 12, 2016, pp. 93-98.

Graves, Alex, "Supervised Sequence Labelling with Recurrent Neural Networks", In Doctoral Dissertation submitted and accepted by the Faculty of Computer Science, Technical University of Munich, Jan. 14, 2008, 124 Pages.

Hakkani-Tur, et al., "Multi-Domain Joint Semantic Frame Parsing Using Bi-Directional RNN-LSTM", In Proceedings of the Conference of the International Speech Communication Association, Sep. 8, 2016, 5 Pages.

Heck, et al., "Leveraging Knowledge Graphs for Web-Scale Unsupervised Semantic Parsing", In Proceedings of 14th Annual Conference of the International Speech Communication Association, Aug. 25, 2013, 5 Pages.

Kim, Yoon, "Convolutional Neural Networks for Sentence Classification", In the Proceedings of the Conference on Empirical Methods in Natural Language Processing, Oct. 25, 2014, pp. 1746-175.

Le, et al., "Distributed Representations of Sentences and Documents", In the Proceedings of the 31st International Conference on Machine Learning, Jun. 21, 2014, 9 Pages.

Ling, et al., "Finding Function in Form: Compositional Character Models for Open Vocabulary Word Representation", In Proceedings of the Conference on Empirical Methods in Natural Language Processing, Sep. 17, 2015, pp. 1520-1530.

Liu, et al., "Query Understanding Enhanced by Hierarchical Parsing Structures", In Proceedings of Workshop on Automatic Speech Recognition and Understanding Dec. 8, 2013, pp. 72-77.

Ma, et al., "Dependency-Based Convolutional Neural Networks for Sentence Embedding", In Proceedings of the 53rd Annual Meeting of the Association for Computational Linguistics and the 7th International Joint Conference on Natural Language Processing, Jul. 16, 2015, pp. 174-179.

Ma, et al., "Knowledge Graph Inference for Spoken Dialog Systems", In Proceedings of the IEEE International Conference on Acoustics, Speech and Signal Processing, Apr. 19, 2015, 5 Pages.

Mikolov, et al., "Distributed Representations of Words and Phrases and Their Compositionality", In Proceedings of the 26th International Conference on Neural Information Processing Systems, vol. 2, Dec. 5, 2013, 9 Pages.

Mikolov, et al., "Recurrent Neural Network Based Language Model", In Proceedings of 11th Annual Conference of the International Speech Communication Association, Sep. 26, 2010, pp. 1045-1048.

Mnih, "Recurrent Models of Visual Attention", In Proceedings of the 27th International Conference on Neural Information Processing Systems, vol. 2, Dec. 8, 2014, 9 Pages.

Peng, et al., "Learning Word Segmentation Representations to Improve Named Entity Recognition for Chinese Social Media",

(56) References Cited

OTHER PUBLICATIONS

Retrieved From: https://pdfs.semanticscholar.org/7774/807438f36c62d34a627e2531a2e69dfb680e.pdf, Mar. 2, 2016, 6 Pages.
Shen, et al., "Neural Attention Models for Sequence Classification: Analysis and Application to Key Term Extraction and Dialogue Act Detection", In Proceedings of Conference of the International Speech Communication Association, Sep. 8, 2016, pp. 2716-2720.
Socher, et al., "Grounded Compositional Semantics for Finding And Describing Images with Sentences", In Transactions of the Association of Computational Linguistics, vol. 2, Issue 1, Apr. 2014, pp. 207-218.
Stollenga, et al., "Deep networks with Internal Selective Attention Through Feedback Connections", In Proceedings of the 27th International Conference on Neural Information Processing Systems, Dec. 8, 2014, 9 Pages.
Tai, et al., "Improved Semantic Representations from Tree-Structured Long Short-Term Memory Networks", In Proceedings of the 53rd Annual Meeting of the Association for Computational Linguistics and the 7th International Joint Conference on Natural Language Processing, Jul. 26, 2015, pp. 1556-1566.
Xiong, et al., "Dynamic Memory Networks for Visual and Textual Question Answering", Retrieved From: https://arxiv.org/pdf/1603.01417.pdf, Mar. 4, 2016, 10 Pages.
Xu, et al., "Show, Attend and Tell: Neural Image Caption Generation with Visual Attention", In the Proceedings of the 32nd International Conference on Machine Learning, Jun. 1, 2015, 10 Pages.
Yang, et al., "Embedding Entities and Relations for Learning and Inference in Knowledge Bases", In Proceedings of International Conference on Learning Representations, May 7, 2015, 12 Pages.
Yih, et al., "Semantic Parsing Via Staged Query Graph Generation: Question Answering With Knowledge Base", In Proceedings of 53rd Annual Meeting of the Association for Computational Linguistics and 7th International Joint Conference on Natural Language Processing, Jul. 26, 2015, pp. 1321-1331.
Zeng, et al., "Relation Classification Via Convolutional Deep Neural Network", In Proceedings of the 25th International Conference on Computational Linguistics, Aug. 23, 2014, pp. 2335-2344.
Zhang, et al., "Relation Classification Via Recurrent Neural Network", Retrieved From: https://arxiv.org/pdf/1508.01006.pdf, Dec. 25, 2015, 11 Pages.
Bordes, et al., "Learning End-to-End Goal-Oriented Dialog", Retrieved from <<https://arxiv.org/pdf/1605.07683v1.pdf>>, May 24, 2016, 11 Pages.
Chen, et al., "End-to-End Memory Networks with Knowledge Carryover for Multi-Turn Spoken Language Understanding", In Interspeech, Sep. 8, 2016, pp. 3245-3249.
"International Search Report and Written Opinion Issued in PCT Application No. PCT/US2017/038210", dated Sep. 22, 2017, 12 Pages.
"Notice of Allowance Issued in U.S. Appl. No. 15/258,639", dated Mar. 7, 2019, 17 Pages.
Bahdanau, et al., "Neural Machine Translation by Jointly Learning to Align and Translate", In Proceedings of International Conference on Learning Representations, May 7, 2015, pp. 1-15.
Bhargava, et al., "Easy Contextual Intent Prediction and Slot Detection", In Proceedings of IEEE International Conference on Acoustics, Speech, and Signal, May 26, 2013, 5 pages.
Chelba, et al., "Speech Utterance Classification", In Proceedings of IEEE International Conference on Acoustics, Speech, and Signal Processing, Apr. 2003, 4 pages.
Chen, et al., "Deriving local relational surface forms from dependency-based entity embeddings for unsupervised spoken language understanding", In Proceedings of IEEE Spoken Language Technology Workshop, Dec. 7, 2014, 6 pages.
Chen, et al., "Matrix factorization with knowledge graph propagation for unsupervised spoken language understanding", In Proceedings of The 53rd Annual Meeting of the Association for Computational Linguistics and The 7th International Joint Conference on Natural Language Processing of the Asian Federation of Natural Language Processing, Jul. 2015, 12 pages.

Cho, et al., "On the Properties of Neural Machine Translation: Encoder Decoder Approaches", In Proceedings of the Computing Research Repository, Sep. 3, 2014, 9 pages.
Chu-Carroll, Jennifer, "A Statistical Model for Discourse Act Recognition in Dialogue Interaction", In AAAI Technical Report SS, Retrieved on: Apr. 21, 2016, pp. 12-17.
Chung, et al., "Empirical Evaluation of Gated Recurrent Neural Networks on Sequence Modeling", In Proceedings of the Computing Research Repository, Dec. 11, 2014, pp. 1-9.
Deng, et al., "Use of Kernel Deep Convex Networks and End-to-End Learning for Spoken Language Understanding", In Proceedings of the IEEE Spoken Language Technology Workshop, Dec. 2, 2012, pp. 210-215.
Deoras, et al., "Deep Belief Network based Semantic Taggers for Spoken Language Understanding", In Proceedings of the 14th Annual Conference of the International Speech Communication Association, Aug. 25, 2013, 5 pages.
Elman, Jeffrey L., "Finding Structure in Time", In Journal of Cognitive Science, vol. 14, Issue 2, Apr. 1990, pp. 179-211.
Graves, et al., "Neural Turing Machines", In Proceedings of the Computing Research Repository, Oct. 20, 2014, pp. 1-26.
Graves, et al., "Speech Recognition with Deep Recurrent Neural Networks", In Proceedings of IEEE International Conference on Acoustics, Speech and Signal Processing, May 26, 2013, 5 pages.
Hafiner, et al., "Optimizing SVMs for complex call classification", In Proceedings of IEEE International Conference on Acoustics, Speech, and Signal Processing, vol. 1, Apr. 6, 2003, 4 pages.
Hochreiter, et al., "Long Short-Term Memory", In Journal of Neural Computation, vol. 9, No. 8, Nov. 1997, pp. 1-32.
"Implementing Dynamic memory networks", Published on: Feb. 5, 2016 Available at: https://yerevann.github.io/2016/02/05/implementing-dynamic-memory-networks/.
"Inside Speech Recognition", Published on: Oct. 18, 2002 Available at: http://www.tldp.org/HOWTO/Speech-Recognition-HOWTO/inside.html.
Jozefowicz, et al., "An empirical exploration of recurrent network architectures", In Proceedings of the 32nd International Conference on Machine Learning, Jul. 6, 2015, 9 pages.
Kingma, et al., "Adam: A Method for Stochastic Optimization", In Proceedings of the Computing Research Repository, Dec. 22, 2014, pp. 1-15.
Kumar, et al., "Ask Me Anything: Dynamic Memory Networks for Natural Language Processing", In Proceedings of 33rd International Conference on Machine Learning, Retrieved on: Apr. 21, 2016, 10 pages.
Liu, et al., "Deep Contextual Language Understanding in Spoken Dialogue Systems", In Proceedings of 16th Annual Conference of the International Speech Communication Association, Sep. 6, 2015, 5 pages.
Mesnil, et al., "Using recurrent neural networks for slot filling in spoken language understanding", In Proceedings of IEEE/ACM Transactions on Audio, Speech, and Language Processing, Mar. 2015, 14 pages.
Pieraccini, et al., "A speech understanding system based on statistical representation of semantics", In Proceedings of IEEE International Conference on Acoustics, Speech, and Signal Processing, vol. 1, Mar. 23, 1992, 4 pages.
Ravuri, et al., "Recurrent neural network and LSTM models for lexical utterance classification", In Proceedings of International Speech Communication Association, Sep. 2015, 5 pages.
Raymond, et al., "Generative and discriminative algorithms for spoken language understanding", In Proceedings of 8th Annual Conference of the International Speech Communication Association, Aug. 27, 2007, 4 pages.
Sarikaya, et al., "Application of deep belief networks for natural language understanding", In Proceedings of IEEE Transactions on Audio, Speech and Languague Processing, Feb. 2014, pp. 1-7.
Sarikaya, et al., "Deep belief nets for natural language call-routing", In Proceedings of IEEE International Conference on Acoustics, Speech and Signal Processing, May 22, 2011, 4 pages.

(56) References Cited

OTHER PUBLICATIONS

Shi, et al., "Contextual Spoken Language Understanding Using Recurrent Neural Networks", In Proceedings of IEEE International Conference on Acoustics, Speech and Signal Processing, Apr. 19, 2015, pp. 5271-5275.

Sukhbaatar, et al., "End-to-end memory networks", In Proceedings of Advances in Neural Information Processing Systems, Dec. 7, 2015, pp. 1-11.

Sutskever, et al., "Sequence to Sequence Learning with Neural Networks", In Proceedings of Advances in neural information processing systems, Dec. 8, 2014, pp. 1-9.

Tur, et al., "Spoken language understanding: Systems for extracting semantic information from speech", In Publication of John Wiley & Sons, Mar. 28, 2011.

Tur, et al., "Towards deeper understanding: Deep convex networks for semantic utterance classification", In Proceedings of IEEE International Confrence on Acoustics, Speech, and Signal Processing, Mar. 2012, pp. 5045-5048.

Wang, et al., "Spoken language understanding", In Proceedings of IEEE Signal Processing Magazine, vol. 22, Issue 5, Sep. 2005, p. 16-31.

Weston, et al., "Memory networks", In Proceedings of International Conference on Learning Representations, May 7, 2015, pp. 1-15.

Xu, et al., "Contextual Domain Classification in Spoken Language Understanding Systems Using Recurrent Neural Network", In Proceedings of IEEE International Conference on Acoustic, Speech and Signal Processing, May 4, 2014, pp. 136-140.

Xu, et al., "Convolutional neural network based triangular CRF for joint intent detection and slot filling", In Proceedings of IEEE Workshop on Automatic Speech Recognition and Understanding, Dec. 8, 2013, 6 pages.

Yao, et al., "Recurrent neural networks for language understanding", In Proceedings of 14th Annual Conference of the International Speech Communication Association, Aug. 2013, 5 pages.

Yao, et al., "Spoken Language Understanding Using Long Short-Term Memory Neural Networks", In Proceedings of IEEE Spoken Language Technology Workshop, Dec. 7, 2014, 6 pages.

"Non Final Office Action Issued in U.S. Appl. No. 16/444,616", dated Jul. 11, 2019, 30 Pages.

"Final Office Action Issued in U.S. Appl. No. 16/444,616", dated Dec. 5, 2019, 31 Pages.

"Non-Final Office Action Issued in U.S. Appl. No. 16/444,616", dated Apr. 3, 2020, 26 Pages.

"Notice of Allowance Issued in U.S. Appl. No. 16/444,616", dated Jul. 16, 2020, 15 Pages.

* cited by examiner

D  communication
I  send_email
U  just sent email to bob about fishing this weekend
S  O    O    O    O    B-contact_name    O    B-subject  I-subject  I-subject
→ send_email(contact_name="bob", subject="fishing this weekend")

$U_1$  send email to bob
$S_1$          B-contact_name
→ send_email(contact_name="bob")

$U_2$  are  we  going  to  fish  this  weekend
$S_2$  B-message  I-message  I-message  I-message
       I-message  I-message  I-message
→ send_email(message="are we going to fish this weekend")

FIG. 3

END-TO-END MEMORY NETWORKS FOR CONTEXTUAL LANGUAGE UNDERSTANDING

BACKGROUND

Traditionally a language understanding component such as a spoken language understanding (SLU) component of a spoken dialogue system (SDS) considers each input, a spoken sentence or utterance, as a turn in isolation. That is, the SLU component treats each spoken sentence or utterance independent of others. In the traditional architecture of dialogue systems, then the components that followed sometimes aggregated separate phases for a few turns to collect pseudo-multi-turn information.

In the last decade, goal-oriented SDSs have been incorporated in various devices, with the goal being to enable users to speak to systems in order to finish tasks more efficiently. A typical pipeline of tasks in traditional spoken language understanding (SLU) is to parse user utterances into semantic frames to capture meaning. The first task is to decide the domain given the input utterance, and based on the domain, the second task is to predict the intent, and then the third task is to fill associated slots corresponding to a domain-specific semantic template.

Such traditional approaches have several disadvantages. First, errors from previous turns are propagated to subsequent turns. Thus, earlier errors degrade performance of the current and subsequent turns. Second, knowledge mentioned in the long history is often not carried into the current turn as only a few turns are aggregated.

Improvement in accuracy and processing speed for SLU is important for conversation understanding systems like digital personal assistants.

SUMMARY

This disclosure describes systems, methods, and computer-executable instructions on computer-readable media for extracting salient semantics for modeling knowledge carryover in multi-turn conversations. The architecture described herein can use end-to-end memory networks to model knowledge carryover in multi-turn conversations, where inputs encoded with intents and slots can be stored as embeddings in memory and decoding can exploit latent contextual information from memory, e.g., demographic context, visual context, semantic context, etc.

In various examples, the architecture described herein can use end-to-end memory networks to model knowledge carryover in multi-turn conversations, where utterance inputs encoded with intents and slots can be stored as embeddings in memory and decoding can apply latent contextual information, e.g., an attention model, to leverage previously stored semantics for semantic parsing, e.g., for joint intent prediction and slot tagging.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIG. 3 is an example semantic frame for a communication-related user utterance, "just send email to bob about fishing this weekend," to model interactions during training and operation of a computational model for end-to-end memory networks for contextual, e.g., multi-turn, language understanding, including multi-turn SLU, according to various examples described herein.

FIG. 4A depicts an example end-to-end memory network model jointly encoding history and current knowledge for slotfilling in contextual, e.g., multi-turn, language understanding, including multi-turn SLU according to various examples described herein.

FIG. 4B depicts an example end-to-end memory network model jointly encoding history and current knowledge with long-term factual and personalized information for slotfilling in contextual, e.g., multi-turn, language understanding, including multi-turn SLU according to various examples described herein.

FIG. 4C depicts an example end-to-end memory network model jointly encoding history and current knowledge with long-term factual and personalized information for slotfilling in contextual, e.g., multi-turn, language understanding, including multi-turn SLU according to various examples described herein.

DETAILED DESCRIPTION

Overview

Figure 1:
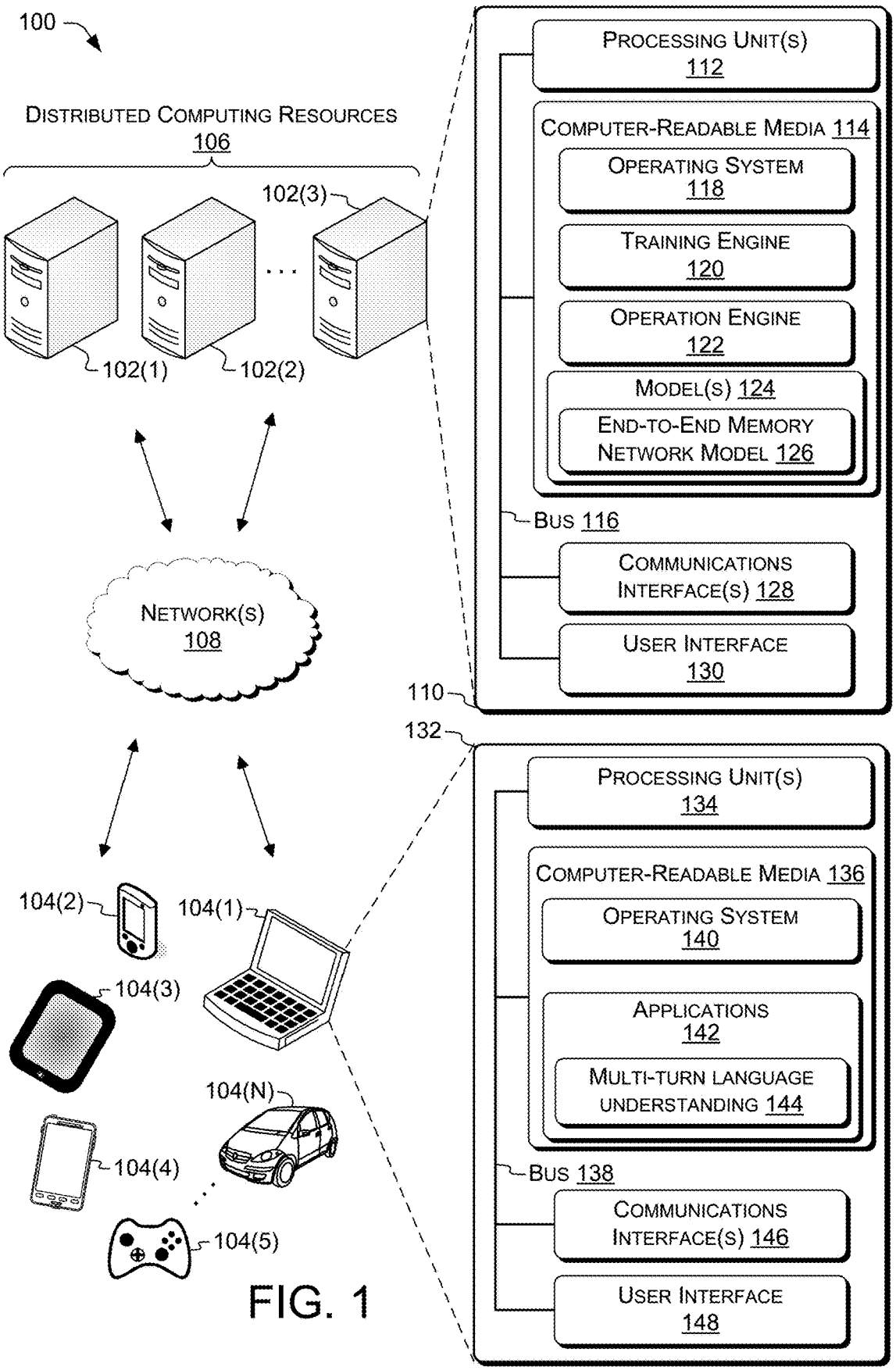
FIG. 1 is a block diagram depicting an example environment for implementing end-to-end memory networks for contextual, e.g., multi-turn, language understanding, including multi-turn spoken language understanding (SLU) as described herein.

Examples described herein provide techniques and constructs to improve the training and operation of computational models, e.g., neural networks such as recursive neural networks, recurrent neural networks (RNNs), etc. In the last decade, a variety of practical, goal-oriented conversation understanding systems have been built for a number of domains, such as the virtual personal assistants Microsoft Cortana, Apple Siri, Google Now, Amazon Echo/Alexa, etc.

In various examples, end-to-end memory networks as described herein can model knowledge carryover in multi-turn conversations. Inputs can be encoded with intents and slots, and thus encoded can be stored in memory. Latent contextual information, e.g., an attention model, can be applied to leverage previously stored semantics for semantic parsing of current input, e.g., to jointly predict intent and fill slots. Regarding context, previous memory networks have relied on facts for question answering. Such previous memory networks have not inferred context to improve human-computer conversational interactions.

Experiments on Microsoft Cortana conversational data show that the proposed memory network architecture can effectively extract salient semantics for modeling knowledge carryover in the multi-turn conversations and outperform the results using the state-of-the-art recurrent neural network framework (RNN) designed for single-turn SLU.

Attention model as used herein sets the amount to weight to apply to inputs from the stored inputs. Came from machine translation. The attention model can produce a vector of floating numbers from memories. These can be used to consider context and gain better understanding of input, e.g., conversational input. For example, users want to interact with conversation understanding systems like digital personal assistants more similarly to how they interact with other humans. In order to improve user experience, end-to-end memory networks for contextual, e.g., multi-turn, language understanding can augment or be incorporated in conversation understanding systems to learn what input is important and identify that some input can be discarded. This can enable users to treat conversation understanding systems as personal assistants, as the system can remember important aspects of interactions across multiple inputs, e.g., utterances, which can free users from having to use official names or manually input familiar names or nicknames, such as "Mom." For example, given a calendar entry that notes, "Mom's birthday," and/or when the system receives a user utterance, "call my mom," the system can identify who "Mom" is based on a user's previous interactions regarding Mom, so the user need not utter "Mom's" official name. The system can relieve the user of this burden by leveraging latent contextual information, e.g., an attention model.

In at least one example, an RNN configured for multi-domain joint semantic frame parsing can operate on the input sequence of words (e.g., user queries and verbal utterances) and can produce output in the form of a full semantic frame, including domain, intent, and slots, as shown in FIG. 3.

A baseline RNN-LSTM architecture can be based on the slot filling task, and can explore various architectures for exploiting lexical context. Alternate RNN architectures can be used including gated recurrent units (RNN-GRU). Examples described herein can extend the RNN-LSTM architecture for the slot filling tsk to model domain and intent of user utterances in addition to slot filling as a multi-domain multi-task architecture for SLU. Experiments investigated the performance of alternative architectures on Microsoft Cortana multi-domain data as examples. Compared to previous approaches, e.g., a single-turn SLU, end-to-end memory networks for contextual, e.g., multi-turn, language understanding as described herein outperforms alternatives with the best F-measure in the experimental results.

As used herein, F-measure represents a combined measure of precision and recall, e.g., an average of scores precision and recall. As used herein, semantic parsing represents parsing of an input, be it a verbal utterance or other form of query, to identify parts and/or characteristics of the input. Semantic parsing can include identifying domain and intent of the input, and assigning words of the input to slots, though other terminologies are may be included in semantic parsing as described herein including domain, dialogue, constraint slot, and requested slot, combination of action and requested slot, and equivalents thereof. As used herein domain represents a category identified for an input from semantic parsing. As used herein intent represents the goal of an input for semantic parsing. As defined herein slot represents a constraint for a query or argument for an API for semantic parsing.

As used herein query means an input to multi-domain joint task semantic frame parsing and utterance means a type of sound-based query input.

As used herein domain classification represents a task of identifying a category of input for semantic parsing, intent classification represents a task of determining an intent of an input for semantic parsing, and slot filling represents assigning constraints for a query or arguments for an API for semantic parsing without limitation for a minimum or maximum number of slots, including zero slots. In the instance of zero slots in a query, location of the device from which the query is received can be treated an inferred location slot.

Some examples use distributed computing resources and/or processing units provisioned as part of a cluster computing system ("computing cluster" or "cluster") having several discrete computing nodes that work together to accomplish a computing task assigned to the cluster as a whole. Some such systems can have all or a portion of the cluster deployed in a distributed manner, aka in the cloud. Distributed or cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

In various examples, e.g., of computational models trained for end-to-end memory network for contextual, e.g., multi-turn, language understanding and/or other use cases noted herein, the computational models may include artificial neurons, e.g., as found in multilayer perceptrons and/or other neural networks. A neural network can have none, one or more, or at least two hidden layers. The techniques described herein may include the use of an algorithm to parallelize the training of the RNNs across multiple processing units, e.g., cores of a multi-core processor and/or multiple general-purpose graphics processing units (GPGPUs). Accordingly, multiple layers of RNNs may be processed in parallel on the multiple processing units. Neural networks such as RNNs can be trained with minibatch-based stochastic gradient descent (SGD). Other frameworks besides SGD can be used, e.g., minibatch non-stochastic gradient descent and/or other mathematical-optimization techniques.

In some examples, an RNN can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back via the memory cells.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s).

Experiments have demonstrated that the end-to-end memory network for contextual, e.g., multi-turn, language understanding described herein outperforms results from an alternative approach using a state-of-the-art recurrent neural network framework (RNN) designed for a single-turn SLU.

Various environments, configurations of electronic devices, and methods for training and using computational models, e.g., for control applications, are described further with reference to FIGS. 1-8. While many examples described herein relate to servers and other non-consumer electronic devices, other types of electronic devices can be used, e.g., as discussed with reference to FIG. 1.

Illustrative Environment

FIG. 1 shows an example environment 100 in which examples of computational model training systems, e.g., recurrent neural network (RNN) training systems or multi-model training systems for end-to-end memory network for contextual, e.g., multi-turn, language understanding, can operate and/or in which computational-model training for end-to-end memory network for multi-turn language understanding and/or use methods for end-to-end memory network for contextual, e.g., multi-turn, language understanding such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, e.g., distributed computing resource(s), and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes of distributed computing resources 106, e.g., in a computing cluster, such as a cloud service such as MICROSOFT AZURE, VMware vCloud, Rackspace, Inc.'s OpenStack, Amazon Web Services AWS, IBM SmartCloud, Oracle Cloud, etc. In the illustrated example, computing device(s) 104 can be clients of distributed computing resources 106 and can submit jobs to distributed computing resources 106 and/or receive job results from distributed computing resources 106. Computing devices 102(1)-102(N) in distributed computing resources 106 can, e.g., share resources, balance load, increase performance, and/or provide fail-over support and/or redundancy. Computing devices 104 can additionally or alternatively operate in a cluster and/or grouped configuration.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers (e.g., 104(3)), tablet hybrid computers, smartphones, mobile phones, mobile phone-tablet hybrid devices, and/or other telecommunication devices (e.g., 104(4)), sensors and/or other devices or systems for detecting characteristics of an environment, such as thermal, optical, vibratory, pressure, weather, and/or other sensors, portable and/or console-based gaming devices and/or other entertainment devices such as network-enabled televisions, set-top boxes, media players, cameras, and/or personal video recorders (PVRs) (e.g., (e.g., 104(5)), represented graphically as a gamepad), automotive computers such as vehicle control systems, vehicle security systems, and/or electronic keys for vehicles (e.g., 104(N), represented graphically as an automobile), desktop computers, and/or integrated components for inclusion in computing devices, appliances, and/or other computing device(s) configured to participate in and/or carry out computational-model training and/or operation as described herein.

In some examples, as indicated, computing device(s), e.g., computing devices 102 and 104, can intercommunicate to participate in and/or carry out computational-model training and/or operation as described herein. For example, a computing device 104 can be a query and/or data source and computing device 102 can be a computational-model training system, as described below with reference to, e.g., FIGS. 2-8.

Different devices and/or types of computing devices 102 and 104 can have different needs and/or ways of interacting with distributed computing resources 106. For example, computing devices 104 can interact with distributed computing resources distributed computing resources 106 with discrete request/response communications, e.g., for responses and/or updates using an already-trained model. Additionally and/or alternatively, computing devices 104 can be query and/or data sources and can interact with distributed computing resources distributed computing resources 106 with discrete and/or ongoing transmissions of data to be used as input to a computational model. This can provide improved accuracy by increasing the number or queries and/or amount of data input to the model. Additionally and/or alternatively, computing devices 104 can be data sinks and can interact with distributed computing resources 106 with discrete and/or ongoing requests for data output from a computational model.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks, etc. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware and/or software components. The illustrated computing device 102 can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Computer-readable media described herein, e.g., computer-readable media 114, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 102, while in some examples at least one processing unit 114, e.g., one or more of a CPU, GPU, and/or hardware logic device, can be external to computing device 102.

Computer-readable media 114 can store, for example, computer-executable instructions of an operating system 118, module(s) of a training engine 120, module(s) of an operation engine 122, and/or other modules, programs, and/or applications that are loadable and executable by processing unit(s) 112. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to operation engine 122, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system 118, the training engine 120, and/or the operation engine 122.

Computer-readable media 114 can also store, for example, one or more computational model(s) 124, individually and/or collectively referred to herein with reference 124. The computational model(s) 124 include, e.g., one or more recurrent neural networks (RNNs) e.g., a multi-domain model and/or an end-to-end memory network model 126. Example RNNs can include long short-term memory (LSTM) units, long short-term memory look around (LSTM-LA) units, or bi-directional long short-term memory (bLSTM) units, with or without look around, RNN architectures including gated recurrent units (RNN-GRU), and/or any combination thereof. As noted above, the computational models 124 can include, e.g., activation weights, functions, and/or thresholds (collectively "parameters") for artificial neurons and/or other computational units (e.g., LSTM units) of one or more neural networks. The training engine 120 and/or the operation engine 122 can determine values of parameters computational models 124 and can use the determined parameters values of computational model 124 to perform data analysis and/or processing.

Processing unit(s) 112 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computing device 102 can also include one or more communications interfaces 128 connected via the bus 116 to processing unit(s) 112 to enable wired and/or wireless communications between computing device(s) 102 and other networked computing devices 102 and/or 104 involved in end-to-end memory network for contextual, e.g., multi-turn, language understanding, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 114 of the computing device 102 can store an operating system 118. In some examples, an operating system 118 is not used (commonly referred to as a "bare metal" configuration). In some examples, the operating system 118 can include components that enable and/or direct the computing device 102 to receive data via various inputs (e.g., user controls, network and/or communications interfaces, memory devices, and/or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., an engineer, to interact with the computing device 102 using a user interface. Additionally, the operating system 118 can include components that perform various functions generally associated with an operating system 118, e.g., storage management and internal-device management.

In some examples, computing device 102 can include a user interface 130 configured to permit a user, e.g., an engineer responsible for computing device 102(3), distributed computing resources 106, environment 100 and/or a neural-network administrator, to operate the training engine 120, the operation engine 122, and/or the model(s) 124 including the end-to-end memory network model 126. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more computer storage media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Other applications in applications 142 can be operable with or optimized for contextual, e.g., multi-turn, language understanding, such as application 144, which can represent a virtual personal assistant. Some examples of operating system 140 are discussed above with reference to inset 110.

In some examples, the computing device 104 can be configured to communicate with distributed computing resources 106 and/or computing device(s) 102 to operate an end-to-end memory network model 126 and/or other computational model 124. For example, the computing device 104 can transmit a request to distributed computing resources 106 and/or computing device(s) 102 for an output of the end-to-end memory network model 126 and/or other computational model(s) 124, receive a response, and take action based on that response. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate a hidden layer of one or more neural network(s).

Computing device 104 can also include one or more communications interfaces 146 connected via the bus 138 to processing unit(s) 134 to enable wired and/or wireless communications between computing device(s) 104 distributed computing resources 106 and/or and other networked computing devices 102 and/or 104 involved in end-to-end memory network for contextual, e.g., multi-turn, language understanding, and/or other computing device(s), over network(s) 108. Some examples are discussed above with reference to communications interface(s) 128.

In some examples, computing device 104 can include a user interface 148. For example, computing device 104(4) can provide user interface 148 to control and/or otherwise interact with distributed computing resources 106 and/or computing devices 102. For example, processing unit(s) 134 can receive inputs of user actions via user interface 148 and transmit corresponding data via communications interface(s) 146 to computing device(s) 102.

User interface 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Illustrative Components

Figure 2:
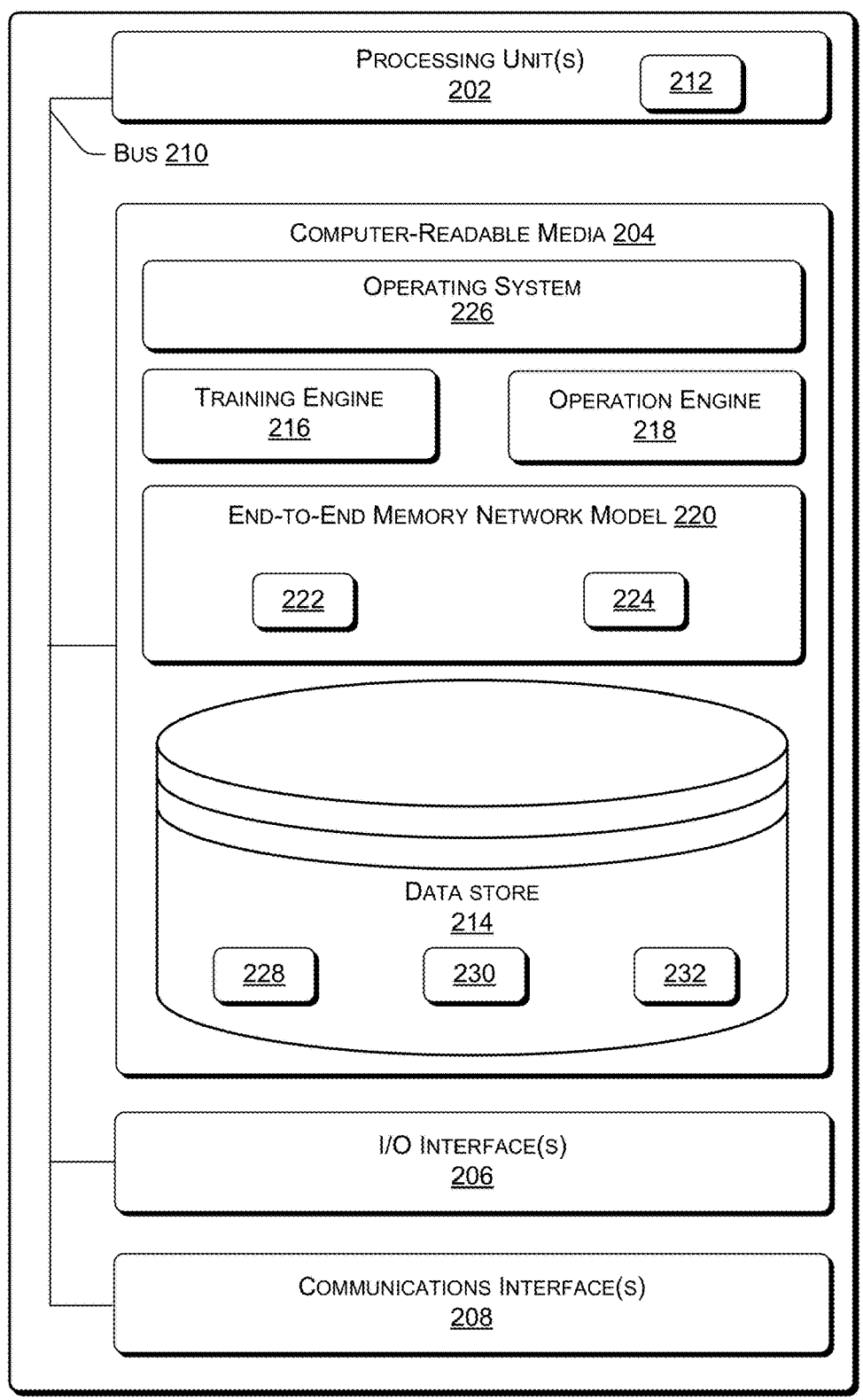
FIG. 2 is a block diagram depicting an example computing device configured to participate in training and operation of computational models end-to-end memory networks for contextual, e.g., multi-turn, language understanding, including multi-turn SLU according to various examples described herein.

FIG. 2 is an illustrative diagram that shows example components of an computing device 200, which can represent computing device(s) 102 and/or 104, and which can be and/or implement an RNN training and/or operation system, device, and/or apparatus, according to various examples described herein. Example computing device 200 includes one or more processing unit(s) 202, computer-readable media 204, input/output interface(s) 206, and network interface(s) 208. The components of computing device 200 are operatively connected, for example, via a bus 210. These components can represent corresponding components from device(s) 102 a, e.g., processing unit(s) 202 can represent processing unit(s) 112, bus 210 can represent bus 116, etc.

In example computing device 200, processing unit(s) 202 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include and/or be connected to a memory 212, e.g., a RAM and/or cache.

Computer-readable media 204 may correspond to computer-readable media 124, and can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 200, while in some examples one or more of a CPU, GPU, and/or accelerator is external to computing device 200.

Computer-readable media 204 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 208, which can represent communications interface(s) 128, can represent, for example, network interface controllers (NICs) or other types of transceiver devices to send and receive communications over a network.

In the illustrated example, computer-readable media 204 includes a data store 214. In some examples, data store 214 includes data storage such as a database, data warehouse, or other type of structured or unstructured data storage. In some examples, data store 214 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 214 can store data for the operations of processes, applications, components, and/or modules stored in computer-readable media 204 and/or executed by processing unit(s) 202 and/or accelerator(s).

Computing device 200 can implement a training engine 216, which generally performs training offline and can represent training engine 120, FIG. 1. Computing device 200 can implement an operation engine 218, which generally operates online and can represent operation engine 122, FIG. 1. Computing device 200 can implement an end-to-end memory network model 220, which is generally updated incrementally and can represent end-to-end memory network model 126, FIG. 1. Computing device 200 can include and/or be included in a system and/or device for training and/or operating a neural network and/or other computational model as described herein.

In some examples, computer-readable media 204 of the computing device 200 can represent computer-readable media 114, FIG. 1, and can store a plurality of modules of the training engine 216, the operation engine 218, and/or the end-to-end memory network model 220. In various examples, the end-to-end memory network model 220 can be configured to have embeddings 222 and/or context 224 as part of the model based on updates of the end-to-end memory network model 220. Processing unit(s) 202 can be configured to execute modules of the plurality of modules. For example, the computer-executable instructions stored on the computer-readable media 204 can upon execution configure a computer such as a computing device 200 to perform operations described herein with reference to the modules of the plurality of modules. The modules stored in the computer-readable media 204 can include instructions that, when executed by the one or more processing units 202, cause the one or more processing units 202 to perform operations described below. Examples of modules in computer-readable media 204 are discussed below. Computer-readable media 204 can also include an operating system 226, which can represent operating system 118, e.g., as discussed above. Computer-readable media 204 can be computer storage media, as discussed above.

In the illustrated example, computer-readable media 204 includes a data store 214. In some examples, data store 214 can include data storage, structured and/or unstructured, such as a database (e.g., a Structured Query Language, SQL, and/or NoSQL database) and/or data warehouse. In some examples, data store 214 can include a corpus and/or a relational database with one or more tables, arrays, indices, stored procedures, and so forth to enable data access. Data store 214 can store data for the operations of processes, applications, components, and/or modules stored in computer-readable media 204 and/or computer instructions in those modules executed by processing unit(s) 202. In some examples, the data store can store computer program instructions 228 (e.g., instructions corresponding to processes described herein and/or to other software executable by processing unit(s) 202), one or more computational models 230, which can represent computational models 126, FIG. 1, training data 232, e.g., datasets, to be used for training and/or operation of the computational models 230, metadata, e.g., of data domains (discussed below), database schema(s), and/or any combination thereof.

Computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, sensors, data aggregators, and/or data feeds, e.g., via application programming interfaces (APIs). The processing units 202 can retrieve data from the data source(s), e.g., via an HTTP request such as a GET to a Web Services and/or Representational State Transfer (REST) API endpoint.

In some examples, the processing unit(s) 202 can access the module(s) on the computer-readable media 204 via bus 210, which can represent bus 116, FIG. 1. I/O interface 206 and communications interface 208 can also communicate with processing unit(s) 202 via bus 210.

The modules of the training engine 216 stored on computer-readable media 204 can include one or more modules, e.g., shell modules and/or API modules, for training neural networks such as RNN, LSTM, LSTM-LA, bLSTM, GRU, etc.

The modules of the operation engine 218 stored on computer-readable media 204 can include one or more modules, e.g., shell modules and/or API modules, for operating neural networks such as RNN, LSTM, LSTM-LA, bLSTM, GRU, etc.

In the training engine 216 and/or the operation engine 218, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs.

FIG. 3 is an example semantic frame for a communication-related user utterance, "just send email to bob about fishing this weekend," to model interactions during training and operation of a computational model for end-to-end memory networks for contextual, e.g., multi-turn, language understanding, including spoken language understanding (SLU), according to various examples described herein.

FIG. 3 shows a communication-related user utterance, "just send email to bob about fishing this weekend" and its semantic frame, send email(contact name="bob", subject="fishing this weekend").

Traditionally, domain detection and intent prediction were framed as classification problems, for which several classifiers such as support vector machines and maximum entropy were employed. Then slot filling was framed as a sequence tagging task, where the in-out-begin (IOB) format was applied for representing slot tags. Given a sequence of words, try to find corresponding sequence of tags for slot filling. Previously hidden Markov models (HMM) or conditional random fields (CRF) have been employed for tagging.

In single-turn interactions deep learning—deep belief networks (DBNs) with deep neural networks (DNNs) have been applied to for domain and intent classification. Deep learning has been viewed as a feature generator and the neural architecture has been merged with CRFs for slot filling. In single-turn interactions, an RNN architecture has been applied for intent determination, and RNNs have also been used for sequence labeling in order to perform slot filling. However, in single-turn interactions each input or utterance is treated independently.

Contextual information has proven useful for SLU modeling. For example, the utterance of FIG. 3 may be followed by an utterance containing the content of the message, so keeping contextual knowledge increases the likelihood of the system correctly estimating a semantic slot message with the same intent, "send email." Previously, information from previous intra-session utterances have been incorporated into SLU tasks on a given utterance of the session by applying SVM-HMMs to sequence tagging, which obtained some improvement. Also, contextual information has been incorporated into an RNN to improve domain classification, intent prediction, and slot filling. However, most prior work exploited information only from the previous turn, ignoring long-term contexts. Another constraint is that the previous models required supervision at each layer of the network. Furthermore, there was no unified architecture to perform multi-turn SLU in an end-to-end framework.

Manipulating explicit storage and a notion of attention facilitates multiple complex computational steps and can model long-term dependencies in sequential inputs, e.g., utterances. In various examples described herein, storage is endowed with a continuous representation modeled by neural networks, in which the stored representations can be read and written to encode knowledge. As described herein, a recurrent neural network (RNN) architecture can read from external memory, in some examples a large external memory, before tagging a current input, e.g., utterance. The model training described herein does not require paired data for each layer of the network; that is, the end-to-end neural network model can be trained end-to-end directly from input-output pairs without supervision to model long-term knowledge carryover for multi-turn SLU.

For language understanding, e.g., spoken language understanding an end-to-end memory network model can take a discrete set of history utterances $\{x_i\}$ that are stored in memory, a current utterance $c=w_1; \ldots; w_T$, and outputs corresponding semantic tags $y=y_1; \ldots; y_T$ that include intent and slot information.

Figure 4A:
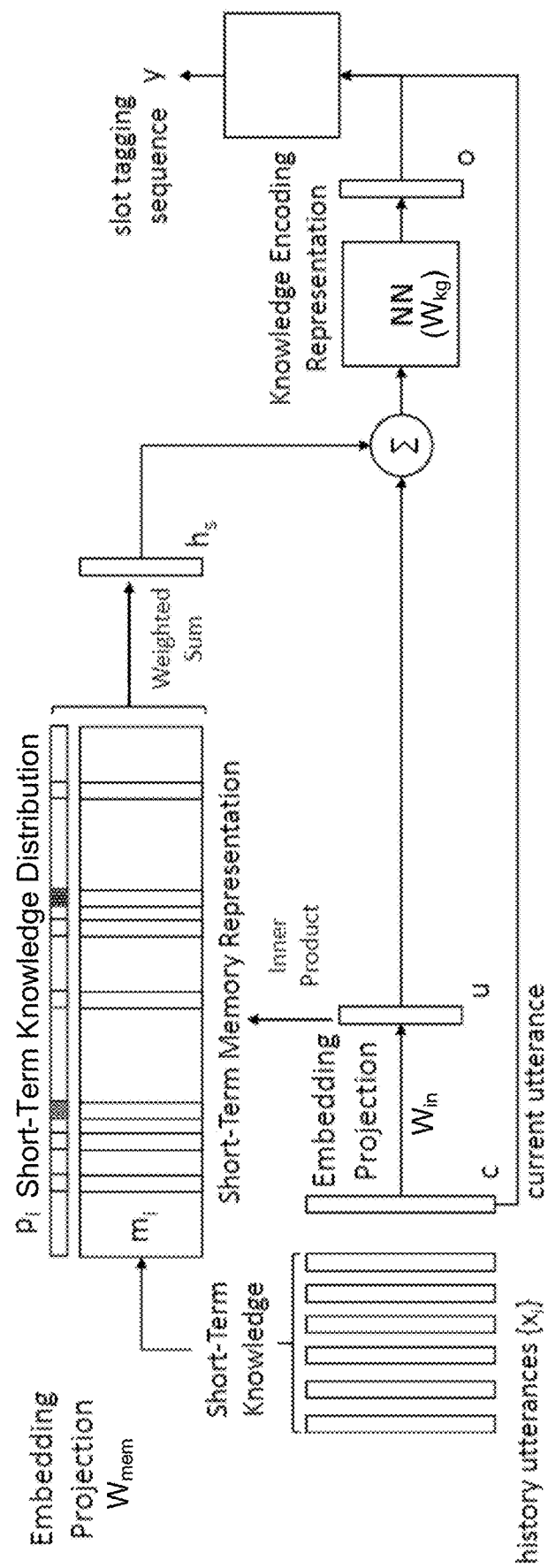
FIGS. 4A, 4B, and 4C illustrate example end-to-end memory network models for contextual, e.g., multi-turn, language understanding, including multi-turn SLU according to various examples described herein.
Figure 4B:
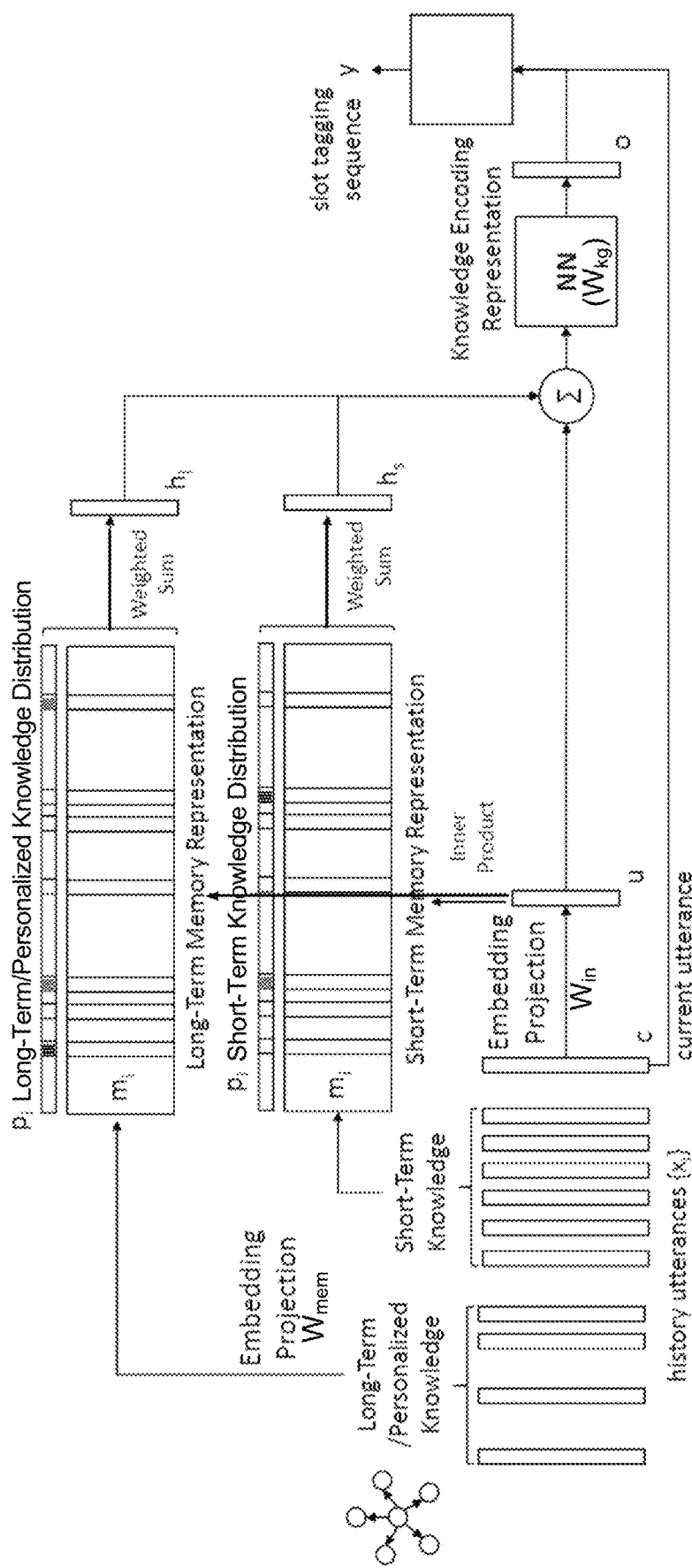
Figure 4C:
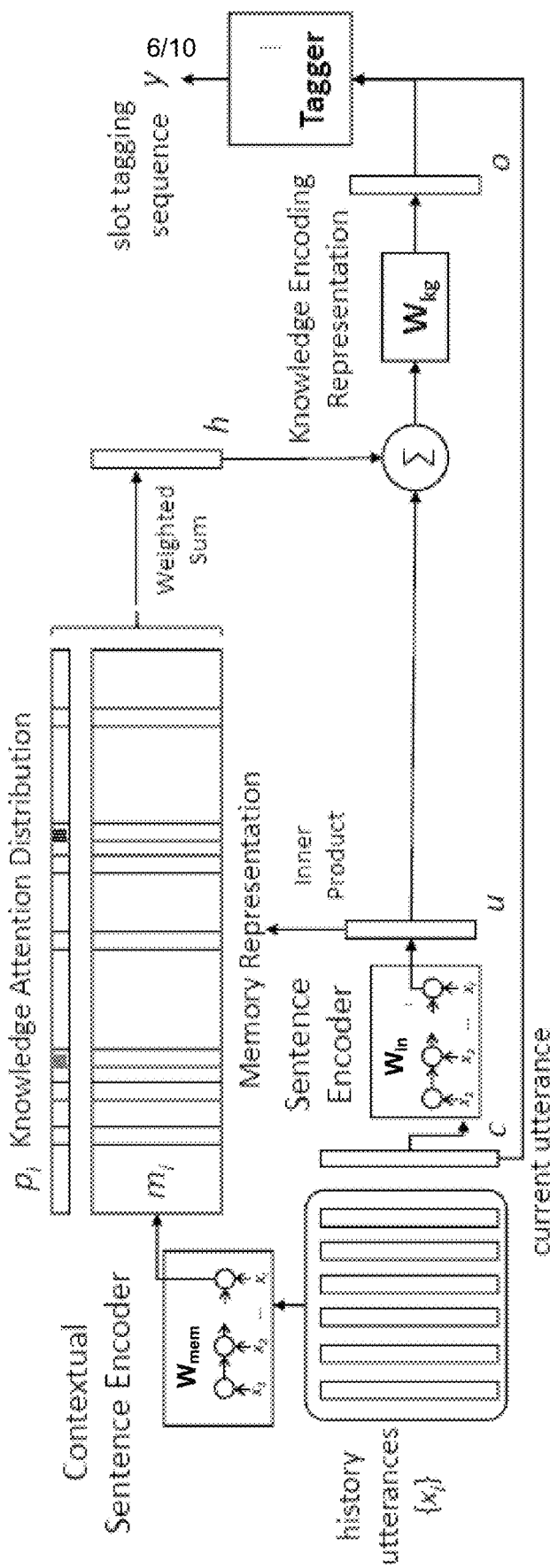

FIG. 4A illustrates an end-to-end memory network model jointly encoding history and current knowledge for intent and slotfilling in contextual, e.g., multi-turn, language understanding, including spoken language understanding. FIG. 4B depicts an example end-to-end memory network model jointly encoding history and current knowledge with long-term factual and personalized information for slotfilling in contextual, e.g., multi-turn, language understanding, including multi-turn SLU according to various examples described herein. The model illustrated in FIG. 4B can provide direct access for both short-term memory and long term memory for personalized information. FIG. 4C depicts another example end-to-end memory network model jointly encoding history and current knowledge with long-term factual and personalized information for slotfilling in contextual, e.g., multi-turn, language understanding, including multi-turn SLU according to various examples described herein. The model illustrated in FIG. 4C can provide direct access for both short-term memory and long term memory for personalized information.

The model, e.g., model 220, can embed inputs, e.g., utterances, into a continuous space and store historic inputs, e.g., historic utterances, x embeddings to the memory. In various examples, the historic inputs model 220 can store, include all historic inputs from the source of the input and/or from other sources associated with the source of the input, e.g., family members of the source, coworkers of the source, other sources in geographical proximity to the source, other sources sharing a context with the source such as demographic contexts (age, gender, occupation, etc.), geolocation context, context from knowledge graph(s), context from search-engine logs, language context, and/or other contextual meta-information, etc. In some examples, the historic inputs model 220 can store, include all historic inputs to the model, without regard to the source of the input and/or all historic inputs to the model of sources who have authorized use of their inputs as inputs, without regard to the source of the input. In some examples, historic inputs can be weighted based on strength of association of source(s) with the source of current input.

The operation engine 218 can compare representation of the current utterance with memory representations to encode carried knowledge via an attention mechanism. In various examples, attention distribution can be based on embedding similarity. In some examples, the attention model can be replaced by a summary model, and/or other models that can exploit latent contextual information from memory. An RNN module can perform encoding. In various examples, the RNN module can include an include long short-term memory (LSTM) units, long short-term memory look around (LSTM-LA) units, or bi-directional long short-term memory (bLSTM) units, with or without look around, RNN architectures including gated recurrent units (RNN-GRU), and/or any combination thereof. In some examples, operation engine 218 can factor in time to smooth distribution of the models. The operation engine can use encoded knowledge and the word sequence to estimate the semantic tags. Four aspects of the operation are described below.

Memory Representation:

To store the knowledge from previous turns, operation engine 218 can convert each input, e.g., utterance, from a previous turn, as a vector $x_i$, into a memory vector $m_i$ with dimension d by encoding the inputs in a continuous space through $W_{mem}$. Operation engine 218 can also encode a vector representation of the current utterance c to a vector u with the same dimension as a vector representation of c through $W_{in}$, the vector u learned using semantic parsing. Example RNNs the operation engine 218 can use for encoding through $W_{mem}$ and/or $W_{in}$ include long short-term memory (LSTM) units, long short-term memory look around (LSTM-LA) units, bi-directional long short-term memory (bLSTM) units, with or without look around, RNN architectures including gated recurrent units (RNN-GRU), and/or any combination thereof. A mathematical representation of the embeddings follows in Equations 1 and 2:

$$m_i = W_{mem} x_i \tag{1}$$

$$u = W_{in} c \tag{2}$$

Knowledge Attention Distribution:

In the embedding space, in various examples operation engine 218 can estimate an attention vector based on input and context vectors. In some examples, operation engine 218 can learn attention vectors using various machine learning algorithms. In some examples, operation engine 218 can calculate a similarity using a probability distribution. In some examples, operation engine 218 can calculate similarity between the current utterance u and each memory vector $m_i$ by taking the inner product followed by a softmax as follows in Equation 3:

$$p_i = \text{softmax}(u^T m_i) \tag{3}$$

where softmax $(z_i) = e^{z_i}/\Sigma_j e^{z_j}$ and $p_i$ can be viewed as attention distribution for modeling knowledge carryover in order to understand the current input.

Knowledge Encoding Representation:

In order to encode the knowledge from history, operation engine 218 can sum a history vector h, which is a sum over the memory embeddings weighted by attention distribution as follows in Equation 4:

$$h = \sum_i p_i m_i \tag{4}$$

In various examples, operation engine 218 can directly compute gradients and back propagate o because the function from input to output is smooth. Then operation engine 218 can pass the sum or concatenation of the memory vector h and the current input embedding u through a weight matrix $W_{kg}$ to generate an output knowledge encoding vector o as shown in Equation 5:

$$o = W_{kg}(h+u) \tag{5}$$

Sequence Tagging: To estimate the tag sequence y corresponding to an input word sequence c, operation engine 218 can use an RNN module for training a slot tagger, where the encoded knowledge o can be fed into the input of the model in order to model knowledge carryover according to Equation 6:

$$y = RNN(o,c) \tag{6}$$

A goal of the language understanding model described herein is to assign a semantic tags for each word in the current utterance. That is, given $c = w_i; \ldots ; w_n$, the model can predict $y = y_i; \ldots ; y_n$ where each tag $y_i$ is aligned with the word $w_i$. In examples, operation engine 218 can use the Elman RNN architecture, including an input layer, a hidden layer, and an output layer; other RNN architectures can be used in some examples. The input, hidden and output layers are made up of a set of neurons representing the input, hidden, and output at each time step t, $w_i$, $h_i$, and $y_i$, respectively. Equations 7 and 8 correspond to calculations of a plain RNN model.

$$h_t = \phi(W w_t + U h_{t-1}), \tag{7}$$

$$\hat{y}_t = \text{softmax}(V h_t), \tag{8}$$

where φ is a smooth bounded function such as tan h, and is the probability $\hat{y}_t$ distribution over semantic tags given the current hidden state $h_t$. The sequence probability can be formulated as Equation 9:

$$p(y|c) = p(y|w_1, \ldots, w_T) = \prod_i p(y_i|w_1, \ldots, w_i) \tag{9}$$

In various examples, training engine 216 can train the model using backpropagation to maximize the conditional likelihood of the training set labels.

Operation engine 218 can use RNN with gated recurrent units (GRUs) to allow each recurrent unit to adaptively capture dependencies of different time scales. This can overcome an issue of gradient vanishing when modeling long-term dependencies, because gated RNN uses a sophisticated activation function including an affine transformation followed by a simple element-wise nonlinearity by using gating units, such as long short-term memory (LSTM) and GRU. RNNs employing long short-term memory (LSTM) and/or GRU perform well in capturing long-term dependencies.

A GRU as described herein has two gates, a reset gate r, and an update gate z. The reset gate can determine the combination between the new input and the previous memory, and the update gate can decide how much the unit updates its activation, or content according to Equations 10 and 11 that follow:

$$r = \sigma(W^r w_t + U^r h_{t-1}) \tag{10}$$

$$z = \sigma(W^z w_t + U^z h_{t-1}) \tag{11}$$

where σ is a logistic sigmoid function.

The activation of the GRU at time t, $h_t$, is a linear interpolation between the previous activation $h_{t-1}$ and the candidate activation $\tilde{h}_t$ according to Equations 12 and 13:

$$h_t = (1-z) \odot \tilde{h}_t + z \odot h_{t-1}, \tag{12}$$

$$\tilde{h}_t = \phi(W^h w_t + U^h(h_{t-1} \odot r))) \tag{13}$$

where ⊙ is an element-wise multiplication. When the reset gate is off, it effectively makes the unit act as if it is reading the first symbol of an input sequence, allowing it to forget the previously computed state. RNN-GRU can yield comparable performance as RNN-LSTM with fewer parameters and less data for generalization. Experiments described herein employed GRUs for RNN models.

Figure 5:
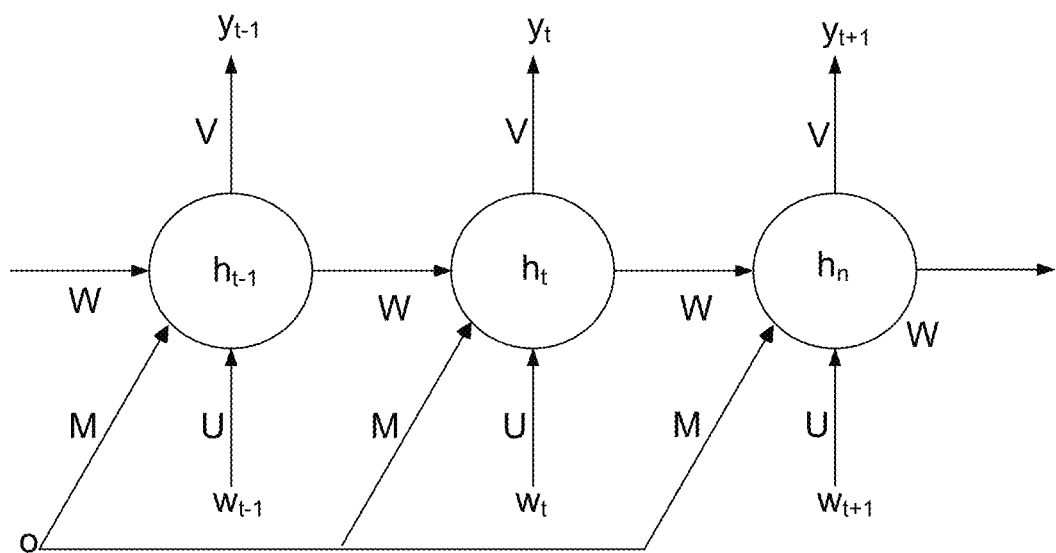
FIG. 5 depicts an example architecture of a recurrent neural network (RNN) cell with encoded knowledge that can be used for slot tagging according to various examples described herein.

FIG. 5 depicts an example architecture of a recurrent neural network (RNN) cell with encoded knowledge that can be used for slot tagging according to various examples described herein.

In order to model the encoded knowledge from previous turns, for each time step t, operation engine 218 can feed the knowledge encoding vector o in Equation 5 into an RNN model together with the word $w_t$. For a plain RNN, the hidden layer can be formulated as Equation 14:

$$h_t = \phi(Mo + W w_t + U h_{t-1}) \tag{14}$$

to replace Equation 7. RNN-GRU can incorporate the encoded knowledge in the similar way, where $M_o$ can be added into Equations 10, 11 and/or 13 to model contextual knowledge similarly.

To train the RNN, e.g., RNN-GRU with knowledge carryover, training engine 216 can jointly update the weights of M, W, and U for both gates, and training engine 216 can jointly update the weights of $W_{mem}$, $W_{in}$, and $W_{kg}$ via backpropagation from the RNN. As described herein, such end-to-end framework does not require the paired training data.

Experiments described herein were performed on multi-turn interactions in the communication domain from Microsoft Cortana, e.g., with a number of turns greater than or equal to 5 in some experiments. The number of semantic tags (slots concatenated with intents) was 32; the number of multi-turn utterances for training was 1,005; the number of multi-turn utterances for testing was 1,001, and the number of multi-turn utterances for development was 207. The test set included 13,779 single-turn utterances, which were used to train a baseline SLU model for comparison.

As described herein, training engine 216 can use mini-batch stochastic gradient descent with a set batch size, e.g., 10, 50, etc. in various experiments, and optimization, e.g., adam optimization approach, AdaGrad optimization approach, RMSProp optimization approach, SGD and/or SGD with Nesterov momentum optimization approaches, etc., with a fixed learning rate, e.g., 0.1, 0.001, etc., $\beta_1=0.9$, $\beta_2=0.999$, $\in=1e^{-08}$ to train models. The dimension of memory embedding can be set, e.g., as 100, 150, etc., and the size of the hidden layer in the RNN can be set, e.g., as 50. The memory size can be set, e.g., to 20 to store knowledge from previous 20 turns. In some examples, the number of iterations per batch can be set, e.g., to 50, the size of the hidden layer in the NN, e.g., RNN, is set, e.g., to 50, and the dropout rate can be set, e.g., to 0.5, to avoid overfitting.

Tables 1 and 2 present comparisons of performance of an RNN Tagger architecture and an Encoder Tagger architecture with performance of an End-to-End Memory Network architecture as described herein.

RNN Tagger treats each test utterance independently and performs sequence tagging via RNN-GRUB. As shown in the Tables, the training set comes from single-turn interactions (row (a)) or multi-turn interactions (row (b)).

Encoder Tagger encodes the knowledge before prediction using RNN-GRUs, and then estimates each tag by considering the current input word and the encoded information via another RNN-GRUs. As shown in the Tables, knowledge was encoded using the current utterance only (row (c)) or entire history together with the current utterance (row (d)). Note that there are no attention and memory mechanisms in this model. The entire history is concatenated together for sequence modeling.

Memory Network takes history and current utterances into account for encoding knowledge, and then performs sequence tagging using RNN-GRUs as described in regarding FIGS. 3 and 4 Table 1.

Tables 1 and 2 represent evaluation metrics as precision (P), recall (R) and F-measure (F1) for semantic tags. In the experiments presented, a tagging result is considered correct if the word-beginning and the word-inside and the word-outside predictions are correct (including both intents and slots). Table 1 shows the performance in percentage (%) of multi-turn SLU on the testing set in terms of first turn only, other turns, and overall, e.g., all turns.

TABLE 1

|  | Model | Training | Knowledge Encoding | First Term | | | Other Terms | | | Overall | | |
| --- | --- | --- | --- | --- | --- | --- | --- | --- | --- | --- | --- | --- |
|  |  |  |  | P | R | F1 | P | R | F1 | P | R | F1 |
| (a) | RNN | single-turn | X | 53.6 | 69.8 | 60.6 | 14.3 | 18.8 | 16.2 | 22.5 | 29.5 | 25.5 |
| (b) | Tagger | multi-turn | X | 70.4 | 46.3 | 55.8 | 41.5 | 50.8 | 45.7 | 45.1 | 49.9 | 47.4 |
| (c) | Encoder-Tagger | multi-turn | current utterance (c) | 74.5 | 47.0 | 57.6 | 54.8 | 57.3 | 56.0 | 57.5 | 55.1 | 56.3 |
| (d) |  | multi-turn | history + current (x, c) | 78.3 | 63.1 | 69.9 | 60.3 | 61.2 | 60.8 | 63.5 | 61.6 | 62.5 |
| (e) | Memory Network | multi-turn | history + current (x, c) | 79.5 | 67.8 | 73.2 | 65.1 | 66.2 | 65.7 | 67.8 | 66.5 | 67.1 |

Furthermore, Table 2 shows the performance in percentage (%) of multi-turn SLU in terms of separate intents and slots results.

TABLE 2

| | | Intent | | | Slot | | |
| --- | --- | --- | --- | --- | --- | --- | --- |
| Model | | P | R | F1 | P | R | F1 |
| (a) | | 34.0 | 31.1 | 32.5 | 29.2 | 38.3 | 33.1 |
| (b) | | 84.1 | 82.8 | 83.4 | 63.7 | 66.5 | 65.1 |
| (c) | | 78.3 | 74.0 | 76.1 | 68.5 | 62.0 | 65.1 |
| (d) | | 91.5 | 86.7 | 89.0 | 68.7 | 66.0 | 67.3 |
| (e) | | 87.6 | 87.3 | 87.5 | 73.7 | 70.8 | 72.2 |

As shown in rows (a) and (b) in Table 1, training on single-turn data may work well when testing the first-turn utterances, achieving 60.6% on F1. However, for other turns, performance of training on single-turn data is worse due to lack of modeling contextual knowledge, (modeling contextual knowledge is employed in the multi-turn interactions shown) and a mismatch between training data and testing data for single-turn data. Treating each utterance from multi-turn interaction independently performs similarly to the tagger trained on single turn data, even though the size of training data is smaller. The reason treating each utterance from multi-turn interaction independently performs similarly to the tagger trained on single turn data is believed to be because there is no mismatch between training data and testing data.

As shown in rows (c) and (d) in Table 1, which represents employing encoder-tagger models, encoding history utterances with current utterance performs better for tagging following turns but worse than encoding the current utterance only for first-turn results. As shown in Table 1, encoder-tagger outperforms RNN tagger (47.4% to 62.5%), which can show that encoder-tagger is able to capture clues from long-term dependencies.

As shown in row (e) in Table 1, of the approaches compared the best overall performance comes from end-to-end multi-turn memory networks, which achieves 67.1%, on F1 score and shows the effectiveness of modeling long-term knowledge for SLU. The end-to-end multi-turn memory network model especially works well when tagging the turns with previous contexts, where the F1 score of SLU is shown as about 65.7%. The performance of first-turn utterances lagged that of the baselines, due to the end-to-end multi-turn memory network model employing the stored knowledge, which may decrease the capability of modeling independent utterances.

Interestingly, as shown in Table 1, the performance of first-turn utterances is also better than the baselines. This is believed to be because the capability of modeling following turns can benefit the performance of first-turn utterances. Comparing with the row (d) of Table 1, end-to-end multi-turn memory network is able to effectively capture salient knowledge for better tagging. Also, in terms of efficiency, the end-to-end multi-turn memory network model can be more than 10× faster than the encoder-tagger model, because each utterance is modeled separately instead of modeling the concatenation of entire history.

Table 2 presents intent-only and slot-only performance of the same set of models as discussed regarding Table 1.

As shown in row (e) of Table 2, the end-to-end multi-turn memory network model significantly outperforms the other models for determining intent, demonstrating that knowledge carryover modeled by the end-to-end multi-turn memory network model can improve inference of semantic intents in the multi-turn interactions.

In terms of slot performance as shown in Table 2, the end-to-end multi-turn memory network model (row (e)) performs similarly to the other models, with the basic tagger trained on single-turn data (row (a)) being an outlier in terms of underperformance.

Illustrative Processes

Figure 6:
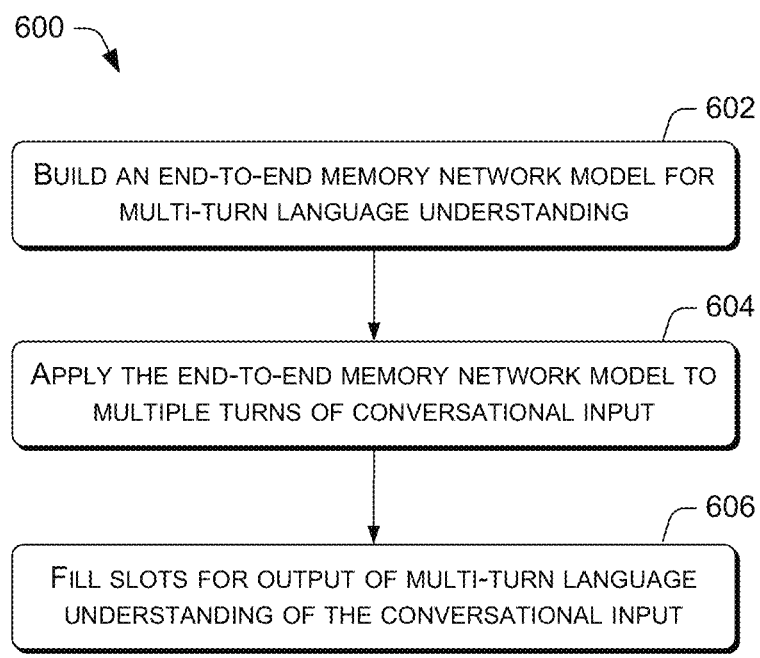
FIG. 6 is a flow diagram that illustrates example processes for training and operating computational models according to various examples described herein.

FIG. 6 is a flow diagram that illustrates an example process 600 for training and operating computational models according to various examples described herein.

Figure 7:
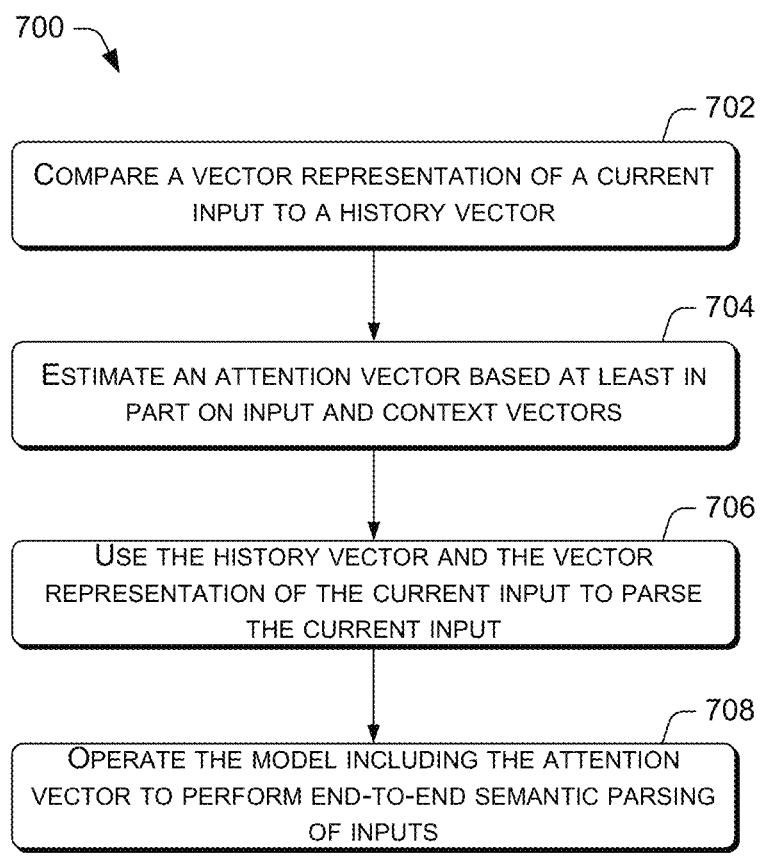
FIG. 7 is a flow diagram that illustrates example processes for training and operating computational models according to various examples described herein.
Figure 8:
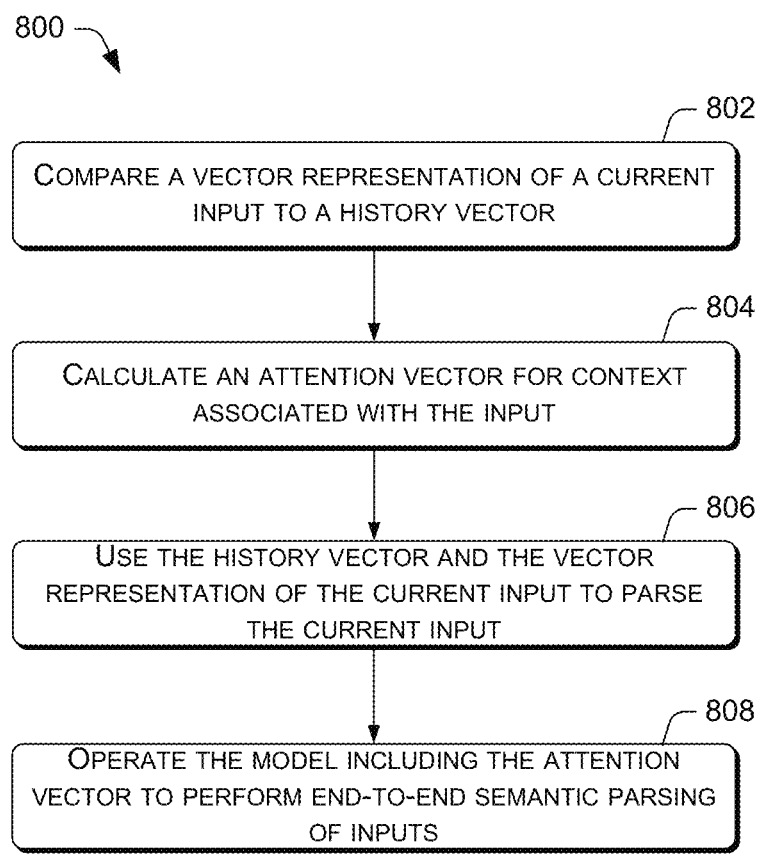
FIG. 8 is a flow diagram that illustrates example processes for operating computational models according to various examples described herein.

Example functions shown in FIGS. 6, 7, and 8 and example processes herein can be implemented by distributed computing resources 106 on and/or otherwise embodied in one or more computing device(s) 102 and/or 104, e.g., a computing device 200, e.g., using software running on such device(s). For the sake of illustration, the example process 600 is described below with reference to processing unit 202 and other components of computing device 200, FIG. 2, which can carry out and/or participate in the steps of the exemplary method. However, other processing unit(s) such as processing unit 112 and/or other components of computing device(s) 102 and/or 104 can carry out step(s) of described example processes such as process 600. Similarly, example method(s) shown in FIGS. 6, 7 and 8 are also not limited to being carried out by any specifically-identified components.

The order in which the operations are described in each example flow diagram and/or process is not intended to be construed as a limitation, and any number of the described operations can be combined in any order and/or in parallel to implement each process. Moreover, the operations in each of FIGS. 6, 7, and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 602, a system as described herein can use a neural network (NN) to build an end-to-end memory network model for contextual, e.g., multi-turn, language understanding. For example, processor 202 can execute training engine 216 offline and/or operation engine 218 online on multiple turns of input in order to build an end-to-end memory network model 220, which can produce latent contextual information to be applied to later received turns of input, e.g., in a conversation.

In some examples, at block 604, a system as described herein can apply the end-to-end memory network model 220 to multiple turns of input in a conversation. For example, processor 202 can execute operation engine 218 to apply end-to-end memory network model 220 to a sequence of turns of input in order to determine an intent, e.g., for contextual information, and to fill slots for the turn of input and in some examples to fill slots for the output of the turn of input.

In some examples, at block 606, a system as described herein can apply the end-to-end memory network model 220 across a plurality of sources of input. For example, processor 202 can execute operation engine 218 to fill slots for the output of contextual, e.g., multi-turn, language understanding, e.g., spoken language understanding, of the conversational input.

FIG. 7 is a flow diagram that illustrates example processes 600 for training and operating computational models according to various examples described herein.

In some examples, at block 702, a system as described herein can compare a vector representation of a current input to a history vector. For example, processor 202 can execute training engine 216 offline and/or operation engine 218 online to compare a vector representation of a current input to a history vector including a representation of inputs from the store of inputs in an end-to-end memory network model 220, which can be applied to semantically parse later received input.

In some examples, at block 704, a system as described herein can estimate an attention vector based at least in part on input and context vectors. For example, processor 202 can execute training engine 216 offline and/or operation engine 218 online to estimate an attention vector based at least in part on input and context vectors in an end-to-end memory network model 220.

In some examples, at block 706, a system as described herein can use the history vector and the vector representation of the current input to parse the current input. For example, processor 202 can execute operation engine 218 to semantically parse input received from one or more user interface(s), e.g., user interface 130/148, including input devices such as a physical keyboard, a soft keyboard, a touch screen, a touch pad, microphone(s), etc.

In some examples, at block 708 a system as described herein can operate the end-to-end memory network model 220 including the attention vector to perform end-to-end semantic parsing of inputs. For example, processor 202 can execute operation engine 218 to apply the end-to-end memory network model 220 to perform end-to-end semantic parsing of inputs, such as inputs from a conversation, and in some examples including end-to-end tagging of inputs and/or tagging or slot-filling for outputs.

FIG. 8 is a flow diagram that illustrates example processes 800 for operating computational models according to various examples described herein.

In some examples, at block 802, a system as described herein can compare a vector representation of a current input to a history vector in an end-to-end memory network. For example, processor 202 can execute training engine 216 offline and/or operation engine 218 online to compare a vector representation of a current input to a history vector including a representation of inputs from a store of inputs in end-to-end memory network model 220. In various examples a neural network architecture, which can include a recurrent neural network architecture, can read from the store of inputs, which can include utterances. End-to-end memory network model 220 can be applied to semantically parse later received input.

In some examples, at block 804, a system as described herein can calculate an attention vector for context associated with the current input. For example, processor 202 can execute training engine 216 offline and/or operation engine 218 online to calculate an attention vector based at least in part on input and context vectors in an end-to-end memory network model 220. In some examples, training engine 216 offline and/or operation engine 218 online can calculate a softmax for the vector representation of the current input to individual vector representations of inputs from the store of inputs.

In some examples, at block 806, a system as described herein can use the history vector and the vector representation of the current input to parse the current input. For example, processor 202 can execute operation engine 218 to semantically parse input received from one or more user interface(s), e.g., user interface 130/148, including input devices such as a physical keyboard, a soft keyboard, a touch screen, a touch pad, microphone(s), etc.

In some examples, at block 808 a system as described herein can operate the end-to-end memory network model 220 including the attention vector to perform end-to-end semantic parsing of inputs. For example, processor 202 can execute operation engine 218 to apply the end-to-end memory network model 220 to perform end-to-end semantic parsing of inputs, such as inputs from a conversation, and in some examples including end-to-end tagging of inputs and/or tagging or slot-filling for outputs.

EXAMPLE CLAUSES

1. A method comprising:
building an end-to-end memory network model for contextual, e.g., multi-turn, language understanding;
applying the end-to-end memory network model to multiple turns of conversational input; and
filling slots for output of contextual, e.g., multi-turn, language understanding of the conversational input.

2: A method as clause 1 recites, wherein the store of inputs includes utterances.

3. A method as either clause 1 or 2 recites, wherein:
the conversational input includes an utterance;
a store of inputs includes a history of utterances; and
a history vector includes a representation of an utterance from the store of inputs.

4. A method as any of clauses 1-3 recites, further comprising comparing a vector representation of a current input from a turn of the multiple turns of conversational input to a history vector, the history vector including a representation of inputs read from a store of inputs.

5. A method as any of clauses 1-4 recites, wherein a neural (NN) architecture is configured to read from the store of inputs for contextual, e.g., multi-turn, language understanding.

6. A method as any of clauses 1-5 recites, wherein the NN includes a recurrent neural network (RNN).

7. A method as any of clauses 1-6 recites, further comprising calculating an attention vector for context associated with the current input, wherein calculating the attention vector for context associated with the current input includes taking an inner product for the vector representation of the current input to individual vector representations of input from the store of inputs.

8. A method as any of clauses 1-7 recites, further comprising: calculating a softmax for the vector representation of the current input to individual vector representations of inputs from the store of inputs.

9. A method as any of clauses 1-8 recites, further comprising operating the end-to-end memory network model including the attention vector to perform end-to-end semantic parsing of the multiple turns of conversational input, wherein end-to-end semantic parsing of the multiple turns of conversational input includes end-to-end tagging of inputs.

10. A method as any of clauses 1-9 recites, further comprising calculating an attention vector for context associated with the conversational input.

11. A method as any of clauses 1-10 recites, further comprising operating the end-to-end memory network model including the attention vector to perform end-to-end semantic parsing of the multiple turns of conversational input.

12. A computer-readable medium having computer-executable instructions thereon, the computer-executable instructions to, upon execution by a processing unit, configure a computing device to perform a method as any of clauses 1-11 recites.

13. A computing device comprising: a processing unit; and a computer-readable medium having computer-executable instructions thereon, the computer-executable instructions to, upon execution by a processing unit, configure the computing device to perform a method as any of clauses 1-11 recites.

14. A system comprising: a processing unit; and a computer-readable medium having computer-executable instructions thereon, the computer-executable instructions to, upon execution by a processing unit, configure a computing device to perform a method as any of clauses 1-11 recites.

15. A system comprising:
means for processing;
means for storing one or more modules of computer-executable instructions to configure a computer;
means for building an end-to-end memory network model for contextual, e.g., multi-turn, language understanding;
means for applying the end-to-end memory network model to multiple turns of conversational input; and
means for filling slots for output of contextual, e.g., multi-turn, language understanding of the conversational input.

16: A system as clause 15 recites, wherein the store of inputs includes utterances.

17. A system as either clause 15 or 16 recites, wherein:
the conversational input includes an utterance;
a store of inputs includes a history of utterances; and
a history vector includes a representation of an utterance from the store of inputs.

18. A system as any of clauses 15-17 recites, further comprising means for comparing a vector representation of a current input from a turn of the multiple turns of conversational input to a history vector, the history vector including a representation of inputs read from a store of inputs.

19. A system as any of clauses 15-18 recites, wherein a neural (NN) architecture is configured to read from the store of inputs for contextual, e.g., multi-turn, language understanding.

20. A system as any of clauses 15-19 recites, wherein the NN includes a recurrent neural network (RNN).

21. A system as any of clauses 15-20 recites, further comprising means for calculating an attention vector for context associated with the current input, wherein calculating the attention vector for context associated with the current input includes taking an inner product for the vector representation of the current input to individual vector representations of input from the store of inputs.

22. A system as any of clauses 15-21 recites, further comprising: means for calculating a softmax for the vector representation of the current input to individual vector representations of inputs from the store of inputs.

23. A system as any of clauses 15-22 recites, further comprising means for operating the end-to-end memory network model including the attention vector to perform end-to-end semantic parsing of the multiple turns of conversational input, wherein end-to-end semantic parsing of the multiple turns of conversational input includes end-to-end tagging of inputs.

24. A system as any of clauses 15-23 recites, further comprising means for calculating an attention vector for context associated with the conversational input.

25. A system as any of clauses 15-24 recites, further comprising means for operating the end-to-end memory network model including the attention vector to perform end-to-end semantic parsing of the multiple turns of conversational input.

26. A method comprising:
comparing a vector representation of a current input to a history vector in an end-to-end memory network, the history vector including a representation of inputs read from a store of inputs;
calculating an attention vector for context associated with the current input; and
using the history vector and the vector representation of the current input to parse the current input; and
operating the model including the attention vector to perform end-to-end semantic parsing of inputs.

27. A method as clause 26 recites, wherein a neural (NN) architecture reads from the store of inputs.

28. A method as either clause 26 or 27 recites, wherein the store of inputs includes utterances.

29. A method as any of clauses 26-28 recites, wherein a neural (NN) architecture reads from the store of inputs and the NN includes a recurrent neural network (RNN).

30. A method as any of clauses 26-29 recites, wherein:
the current input includes an utterance;
the store of inputs includes utterances; and
the history vector includes a representation of an utterance from the store of inputs.

31. A method as any of clauses 26-30 recites, wherein end-to-end semantic parsing of inputs includes end-to-end tagging of inputs.

32. A method as any of clauses 26-31 recites, further comprising applying a recurrent neural network (RNN) to fill slots to output from the end-to-end semantic parsing of inputs.

33. A method as any of clauses 26-32 recites, wherein calculating the attention vector for context associated with the input includes taking an inner product for the vector representation of the current input to individual vector representations of input from the store of inputs.

34. A method as any of clauses 26-33 recites, wherein end-to-end semantic parsing of inputs includes end-to-end semantic parsing of inputs from a conversation.

35. A method as any of clauses 26-34 recites, further comprising: calculating a softmax for the vector representation of the current input to individual vector representations of inputs from the store of inputs.

36. A computer-readable medium having computer-executable instructions thereon, the computer-executable instructions to, upon execution by a processing unit, configure a computing device to perform a method as any of clauses 26-35 recites.

37. A computing device comprising: a processing unit; and a computer-readable medium having computer-executable instructions thereon, the computer-executable instructions to, upon execution by a processing unit, configure the computing device to perform a method as any of clauses 26-35 recites.

38. A system comprising: a processing unit; and a computer-readable medium having computer-executable instructions thereon, the computer-executable instructions to, upon execution by a processing unit, configure a computing device to perform a method as any of clauses 26-35 recites.

39. A system comprising:
means for comparing a vector representation of a current input to a history vector in an end-to-end memory network, the history vector including a representation of inputs read from a store of inputs;
means for calculating an attention vector for context associated with the current input; and
means for using the history vector and the vector representation of the current input to parse the current input; and
means for operating the model including the attention vector to perform end-to-end semantic parsing of inputs.

40. A system as clause 39 recites, wherein a neural (NN) architecture reads from the store of inputs.

41. A system as either clause 39 or 40 recites, wherein the store of inputs includes utterances.

42. A system as any of clauses 39-41 recites, wherein a neural (NN) architecture reads from the store of inputs and the NN includes a recurrent neural network (RNN).

43. A system as any of clauses 39-42 recites, wherein:
the current input includes an utterance;
the store of inputs includes utterances; and
the history vector includes a representation of an utterance from the store of inputs.

44. A system as any of clauses 39-43 recites, wherein end-to-end semantic parsing of inputs includes end-to-end tagging of inputs.

45. A system as any of clauses 39-44 recites, further comprising applying a recurrent neural network (RNN) to fill slots to output from the end-to-end semantic parsing of inputs.

46. A system as any of clauses 39-45 recites, wherein calculating the attention vector for context associated with the input includes taking an inner product for the vector representation of the current input to individual vector representations of input from the store of inputs.

47. A system as any of clauses 39-46 recites, wherein end-to-end semantic parsing of inputs includes end-to-end semantic parsing of inputs from a conversation.

48. A system as any of clauses 39-47 recites, further comprising: calculating a softmax for the vector representation of the current input to individual vector representations of inputs from the store of inputs.

49. A method comprising:
generating an end-to-end trained model from input-output pairs
comparing a vector representation of a current input to a history vector, the history vector including a representation of inputs from the store of inputs;

estimating an attention vector based at least in part on input and context vectors; and using the history vector and the vector representation of the current input to parse the current input; and operating the model including the attention vector to perform end-to-end semantic parsing of inputs.

50. A method as clause 49 recites, wherein the NN includes a recurrent neural network (RNN).

51. A method as either clause 49 or 50 recites, wherein the store of inputs includes utterances.

52. A method as any of clauses 49-51 recites, wherein estimating the attention vector includes calculating an attention vector for context associated with the input.

53. A computer-readable medium having computer-executable instructions thereon, the computer-executable instructions to, upon execution by a processing unit, configure a computing device to perform a method as any of clauses 49-52 recites.

54. A computing device comprising: a processing unit; and a computer-readable medium having computer-executable instructions thereon, the computer-executable instructions to, upon execution by a processing unit, configure the computing device to perform a method as any of clauses 49-52 recites.

55. A system comprising: a processing unit; and a computer-readable medium having computer-executable instructions thereon, the computer-executable instructions to, upon execution by a processing unit, configure a computing device to perform a method as any of clauses 49-52 recites.

56. A system comprising:

means for generating an end-to-end trained model from input-output pairs means for comparing a vector representation of a current input to a history vector, the history vector including a representation of inputs from the store of inputs;

means for estimating an attention vector based at least in part on input and context vectors; and means for using the history vector and the vector representation of the current input to parse the current input; and means for operating the model including the attention vector to perform end-to-end semantic parsing of inputs.

57. A system as clause 56 recites, wherein the NN includes a recurrent neural network (RNN).

58. A system as either clause 56 or 57 recites, wherein the store of inputs includes utterances.

59. A system as any of clauses 56-58 recites, wherein means for estimating the attention vector includes means for calculating an attention vector for context associated with the input.

60. A system as any of clauses 56-58 recites, further comprising means for calculating an attention vector for context associated with the input.

CONCLUSION

Various computational-model training and operation techniques described herein can permit more efficiently parsing input, e.g., queries such as utterances, and more readily identify associated domains to determine a corresponding intent while assigning words of the query to appropriate slots. Various examples can provide more effective ongoing training of a single computational model, e.g., based on application across domains, providing improved accuracy with reduced computational power compared to identifying domains and determining intent and filling slots separately per domain.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/202, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some of the items in the group of items, unless specifically stated otherwise.

What is claimed is:

1. A system comprising:
one or more processing unit(s);
one or more computer-readable media coupled to one or more of the processing unit(s), the one or more computer readable media having thereon one or more modules of computer-executable instructions to configure a computer to perform operations comprising
for applying an end-to-end memory network model to multiple turns of conversational input, the operations comprising, for each turn:
computing a history vector from embeddings of historic inputs, weighted by an attention distribution measuring similarity of the embeddings of the historic inputs to an embedding of a current input, the historic inputs comprising one or more utterances from previous turns of the conversational input; and
assigning semantic tags to a sequence of one or more words of the current input using a neural network operating on the current input and a knowledge encoding vector computed from the embedding of the current input and the history vector,
wherein the embedding of the current input is computed by multiplication of a vector representation of the current input with a first embedding matrix, and the embeddings of the historic inputs are computed by multiplication of a vector representation of the historic input with a second embedding matrix that differs from the first embedding matrix.

2. A system as claim 1 recites, wherein the neural network includes a recurrent neural network (RNN).

3. A system as claim 1 recites, wherein the operations further comprise calculating the attention distribution as a softmax of the inner product of the embedding of the current input with individual embeddings of the historic inputs.

4. The system of claim 1, wherein the historic inputs comprise inputs from one or more users other than a user that provided the current input, the inputs being weighted based on a strength of association between the one or more users that provided the inputs and the user that provided the current input.

5. The system of claim 4, wherein the strength of association between the one or more users that provided the input and the user that provided the current input is based on an association between family members, an association between coworkers, geographical proximity between the users, or shared context between the users.

6. The system of claim 5, wherein the strength of association is based on shared context between the users, the shared context comprising at least one of demographic context, geolocation context, context from a knowledge graph, context from a search-engine log, or language context.

7. A method for applying an end-to-end memory network model to multiple turns of conversational input, comprising:
calculating an attention distribution by comparing an embedding of a current input to embeddings of historic inputs in a memory network model, the historic inputs read from a store of inputs and comprising one or more utterances from previous turns of the conversational input;
calculating a history vector from the embeddings of the historic inputs, weighted by the attention distribution; and
assigning semantic tags to a sequence of one or more words of the current input using a neural network operating on the current input and a knowledge encoding vector computed from the embedding of the current input and the history vector,
wherein the embedding of the current input is computed using by multiplication of a vector representation of the current input with a first embedding matrix, and the embeddings of the historic inputs are computed using by multiplication of a vector representation of the historic input with a second embedding matrix that differs from the first embedding matrix.

8. A method as claim 7 recites, wherein the neural network comprises a recurrent neural network (RNN).

9. A method as claim 7 recites, wherein the attention distribution is calculated as a softmax of the inner product of the embedding of the current input with the embeddings of the historic inputs from the store of inputs.

10. A system comprising:
one or more processing unit(s); and
one or more computer-readable media coupled to one or more of the processing unit(s), the one or more computer readable media storing:
a neural network model that reads from a store of inputs;
a training engine configured to train the neural network model end-to-end from input-output pairs; and
an operation engine configured to operate the model to perform semantic parsing of multiple turns of conversational inputs, wherein operating the model comprises, for each turn:
calculating an attention distribution by comparing an embedding of a current input to embeddings of historic inputs from the store of inputs, the historic inputs comprising one or more utterances from previous turns of the conversational input;
estimating a history vector from the historic inputs and the attention distribution; and
assigning semantic tags to a sequence of one or more words of the current input using a neural network operating on the current input and a knowledge encoding vector computed from the embedding of the current input and the history vector,
wherein the embedding of the current input is computed using by multiplication of a vector representation of the current input with a first embedding matrix, and the embeddings of the historic inputs are computed using by multiplication of a vector representation of the historic input with a second embedding matrix that differs from the first embedding matrix.

11. A system as claim 10 recites, wherein the neural network model includes a recurrent neural network (RNN).

* * * * *